US006802299B2

(12) United States Patent
Mischker et al.

(10) Patent No.: US 6,802,299 B2
(45) Date of Patent: Oct. 12, 2004

(54) METHOD AND DEVICE FOR CONTROLLING THE OPERATION OF AN INTERNAL COMBUSTION ENGINE

(75) Inventors: Karsten Mischker, Leonberg (DE); Rainer Walter, Pleidelsheim (DE); Bernd Rosenau, Tamm (DE); Udo Diehl, Stuttgart (DE); Hermann Gaessler, Vaihingen (DE); Juergen Schiemann, Markgroeningen (DE); Christian Grosse, Kornwestheim (DE); Georg Mallebrein, Korntal-Muenchingen (DE); Volker Beuche, Stuttgart (DE); Stefan Reimer, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/257,350

(22) PCT Filed: Feb. 1, 2002

(86) PCT No.: PCT/DE02/00374

§ 371 (c)(1),
(2), (4) Date: May 27, 2003

(87) PCT Pub. No.: WO02/070882

PCT Pub. Date: Sep. 12, 2002

(65) Prior Publication Data

US 2003/0183202 A1 Oct. 2, 2003

(51) Int. Cl.[7] .............................. F02D 43/00; F01L 1/34; F02M 25/07
(52) U.S. Cl. ............... 123/480; 123/568.14; 123/90.11; 123/90.16
(58) Field of Search .......................... 123/480, 568.14, 123/90.11, 90.14, 90.15, 90.16; 701/104

(56) References Cited

U.S. PATENT DOCUMENTS

| | | | | |
|---|---|---|---|---|
| 4,825,833 A | * | 5/1989 | Ikeura et al. | 123/435 |
| 5,284,116 A | * | 2/1994 | Richeson, Jr. | 123/90.11 |
| 5,748,923 A | * | 5/1998 | Eitrich | 710/305 |
| 5,890,078 A | * | 3/1999 | Furuta | 701/104 |
| 6,278,932 B1 | * | 8/2001 | Baumel et al. | 701/104 |
| 6,453,871 B1 | * | 9/2002 | Fujieda et al. | 123/90.15 |
| 6,553,964 B2 | * | 4/2003 | Arai et al. | 123/90.15 |

FOREIGN PATENT DOCUMENTS

| | | |
|---|---|---|
| DE | 44 08 488 | 9/1995 |
| DE | 196 22 399 | 7/1997 |
| DE | 197 56 342 | 7/1999 |

* cited by examiner

Primary Examiner—Mahmoud Gimie
Assistant Examiner—Arnold Castro
(74) Attorney, Agent, or Firm—Kenyon & Kenyon

(57) ABSTRACT

A control system and a control method for an internal combustion engine have a cylinder including an intake valve and an exhaust valve with a fully variable valve-gear assembly. An engine control unit determines setpoint values with regard to a fresh gas charge, an internal residual gas charge, a torque reduction, an EGR control strategy, and a charging strategy. In addition, a transmission device is provided which transmits setpoint values determined by the engine control unit to a valve control unit in synchronization with the crankshaft angle. The valve control unit controls the fully variable valve-gear assembly of the intake and exhaust valve of the cylinder of the internal combustion engine on the basis of the setpoint values determined by the engine control unit.

18 Claims, 5 Drawing Sheets

METHOD AND DEVICE FOR CONTROLLING THE OPERATION OF AN INTERNAL COMBUSTION ENGINE

The present invention relates to a control device for an internal combustion engine having at least one cylinder including at least one intake valve and at least one exhaust valve having fully variable valve-gear assembly which is individually controllable for each cylinder, and a method of controlling the operation of an internal combustion engine having at least one intake valve and at least one exhaust valve having fully variable valve-gear assembly which is individually controllable for each cylinder.

Conventional internal combustion engines have one or more camshafts for controlling the engine valves, with a predefined valve lifting curve. The valve lifting curve is fixedly defined by the design of the camshaft. A fixed valve lifting curve for the intake and exhaust valves of the internal combustion engine does not permit optimal operation of the internal combustion engine in every operating condition, however, since different internal combustion engine operating conditions generally require different valve lifting curves.

Because of the fixed valve lifting curve, control of charge cycles in the cylinders is only possible to a limited degree, and cannot be optimized for all operating conditions. The term charge cycle refers to expelling exhaust gas from the combustion chamber and filling the combustion chamber of a cylinder of the internal combustion engine with fresh air, possibly added fuel, and—depending on the operating condition and the nature of the internal combustion engine—recirculated residual gas from a previous combustion cycle.

Various fully variable valve drive mechanisms for the intake and exhaust valves have been proposed for variably controlling the charge cycle in the cylinders of an internal combustion engine. With fully variable valve operation, the engine valve processes are flexible. This means that quantities of fresh air and residual gas introduced into the cylinder are controlled by varying the instant of opening and/or closing and/or the opening and/or closing speed and/or the lift of the intake and exhaust valves. Known fully variable valve drive mechanisms are for example electromagnetic solenoid valve control SOLV and electro-hydraulic valve control. Also known are mechanical fully variable valve drive mechanisms such as variable valve timing control VVT in combination with lift control.

Using electromagnetic and electro-hydraulic valve control, the operation of the internal combustion engine does not require provision of a camshaft. Thus the adjustment dynamics, i.e., the extent of possible changes in the instants of opening and closing of the intake and exhaust valves, of the opening lift and the opening and closing speed, are limited only by the mechanical design of the intake and exhaust valves and of the corresponding valve actuators. This means that for every work cycle of a current cylinder the gas charge of the current cylinder may be adjusted independently of a gas charge of a cylinder which is ahead of it in the ignition sequence, and may be adjusted independently of a gas charge of the current cylinder in a previous work cycle.

A control system for an internal combustion engine having fully variable valve operation usually has an engine control unit and a valve control unit which are connected to a software bus system such as a CAN bus. In the engine control unit, control signals are determined for a throttle valve, a fuel injector, a spark plug, and for the valve control unit based for example on output signals from a crankshaft angle sensor, a lambda probe, a hot film air mass sensor, and an intake pipe pressure sensor. The control signals for the valve control unit are conveyed via the software bus system to the valve control unit. The valve control unit translates the control signals into instants of opening and closing for the intake and exhaust valves, an opening lift of the intake and exhaust valves, and an opening or closing speed of the intake and exhaust valves. These control systems transmit a very high volume of data via the software bus system under an operating condition having load cycle processes at high rotational speeds. Accordingly, it is necessary to dimension the software bus system appropriately, i.e., to over-dimension it for normal operating conditions.

FIG. 6 shows a model which illustrates a calculation of a desired charging of a cylinder with fresh air to achieve a setpoint torque, as used for example in the Bosch ME7 engine controller. Using a setpoint torque misetpoint and a rotational speed nmot of the internal combustion engine as input values, with provision for a setpoint lambda efficiency etalamsetpoint and a desired spark angle efficiency etazwsetpoint, a desired fresh air charge rldesire of the cylinder for realizing an induced setpoint torque is calculated. The desired charge rldesire is calibrated to 100% with the displacement volume of the cylinder filled with fresh air at 1.013 mb at 0° C. The input value misetpoint is the setpoint value of the induced torque, which is calibrated to 100% at a charge of 100% fresh air, a lambda $\lambda=1.0$, and optimal spark angle. The input value nmot specifies a rotational speed of the internal combustion engine.

The calculation model illustrated in FIG. 6 for calculating the desired charge of the cylinder with fresh air to achieve a predefined setpoint torque is used today with combustion engines having a throttle valve. This calculation model is inadequate for combustion engines having fully variable valve operation.

The object of the present invention is to provide a control device for an internal combustion engine having fully variable valve-gear assembly, characterized by simple construction, and a simple method of controlling operation of an internal combustion engine having fully variable valve-gear assembly.

This object is achieved according to the present invention using a control device having the features recited in claim 1 and a method having the features recited in claim 10.

Advantageous variants of the present invention derive from the subclaims.

Exemplary embodiments of the present invention are described below, with reference to the accompanying figures.

The description of the following exemplary embodiment relates to a 4-cylinder gasoline engine having intake manifold injection and fully variable valve-gear assembly. All specifications pertaining to valve timing refer to the 4-cylinder gasoline engine of this embodiment. When the present invention is applied to an internal combustion engine having n cylinders, the indicated timing specifications are shifted accordingly.

Figure 1:
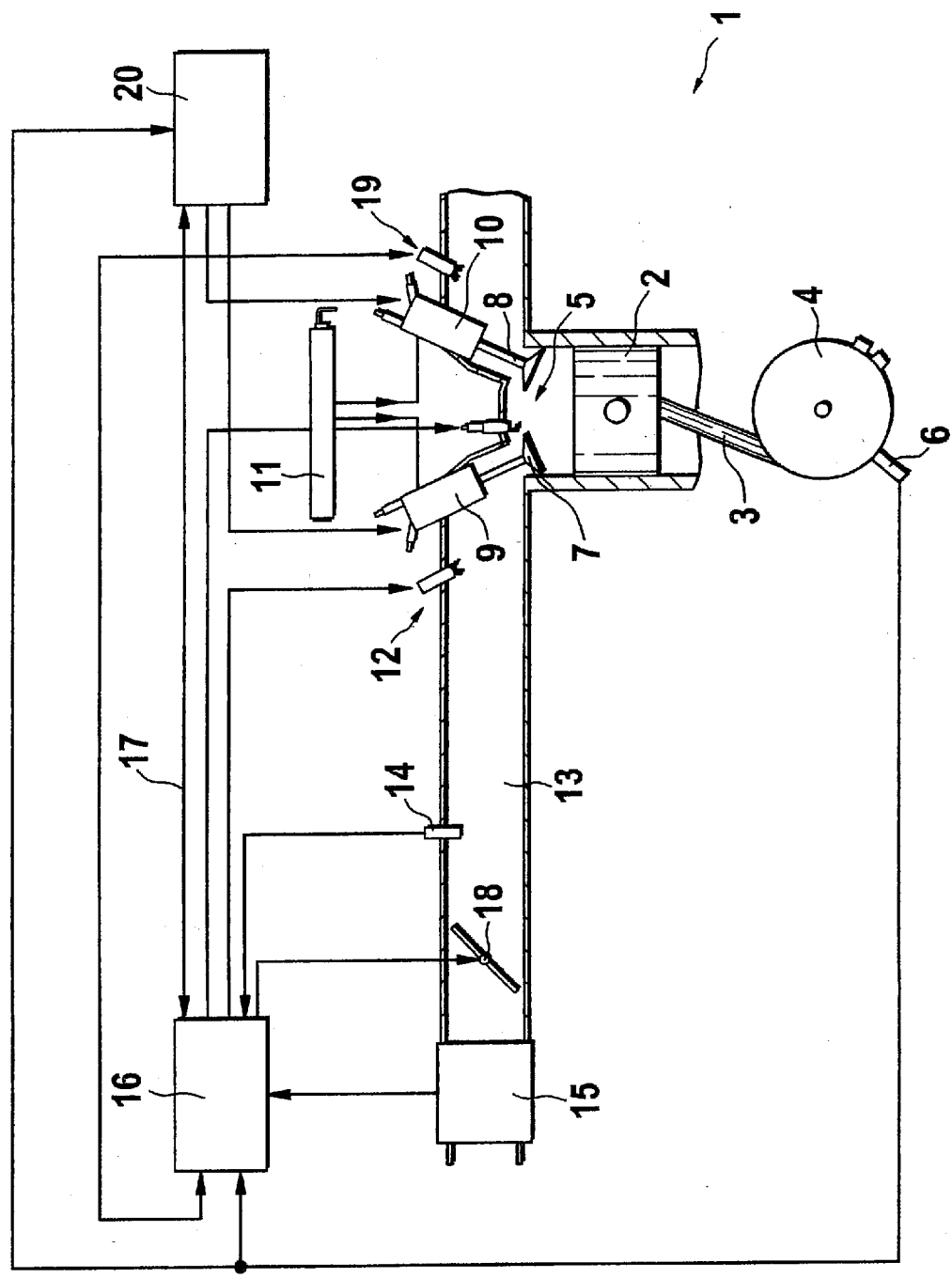
FIG. 1 shows an exemplary embodiment of the control device of the present invention, with a schematic depiction of a cylinder of an internal combustion engine having fully variable valve-gear assembly.

FIG. 1 shows an exemplary embodiment of the control device of the present invention, with a schematic depiction of a cylinder of an internal combustion engine 1 having fully variable valve-gear assembly. FIG. 1 shows only one cylinder of internal combustion engine 1. Reference number 2 designates a piston of a cylinder which is connected to a schematically represented crankshaft 4 by a connecting rod 3. Piston 2 delimits a combustion chamber of the cylinder. On crankshaft 4 there is a crankshaft angle sensor 6, which registers a crankshaft angle of crankshaft 4 and emits a corresponding output signal.

In the combustion chamber of the cylinder there is a spark plug 5. The combustion chamber of the cylinder may be filled with fresh air through an intake valve 7, and emptied through an exhaust valve 8. Intake valve 7 is situated so that it closes or opens an intake port of the cylinder, depending on the position of intake valve 7. Exhaust valve 8 is situated so that it closes or opens an outlet port of the cylinder, depending on the position of exhaust valve 8. During operation of internal combustion engine 1, a stream of air flows from an intake manifold 13 into the combustion chamber of the cylinder through the intake port, and out of the combustion chamber of the cylinder through the outlet port.

Intake valve 7 and exhaust valve 8 are opened and closed by a valve actuator 9 for intake valve 7 and a valve actuator 10 for exhaust valve 8.

Reference number 11 designates a hydraulic pressure chamber which is designed for example as a common rail, which is connected to valve actuators 9 and 10 through hydraulic connections. A hydraulic medium placed under pressure in hydraulic chamber 11 is applied to valve actuators 9 and 10 through the hydraulic connections.

Reference number 12 designates a fuel injector for injecting fuel into intake manifold 13 of internal combustion engine 1. Reference number 14 designates an intake manifold pressure sensor, and reference number 15 designates a hot film air mass sensor. Hot film air mass sensor 15 is located in intake manifold 13 of internal combustion engine 1, upstream from a throttle valve 18 in the direction of the air flow. Throttle valve 18 is located in intake manifold 13 of internal combustion engine 1 in order to control a stream of air into intake manifold 13. The direction of the air stream in intake manifold 13 of internal combustion engine 1 goes from the hot film air mass sensor past throttle valve 18, past intake manifold pressure sensor 14, which is located in a wall of intake manifold 13, and past fuel injector 12, which injects fuel into intake manifold 13. The fresh air, with an admixture of fuel, is then aspirated through intake valve 7 into the combustion chamber of internal combustion engine 1, compressed, ignited by spark plug 5, and after an upward movement of piston 2 is expelled through exhaust valve 8, which is opened for this purpose. The emission air stream, or exhaust air stream, is then carried away past a lambda probe 19 into an exhaust system (not shown).

When fuel is injected into intake manifold 13 by fuel injector 12, the greater part of the injected fuel is aspirated into the combustion chamber of the cylinder together with the fresh air when intake valve 7 is open. However, part of the fuel wets the walls of intake manifold 13 and forms a film on the walls. Furthermore, in the event of a charge reduction due to retarded closing of intake valve 7, the excess fuel which is not aspirated into the combustion chamber because of the charge reduction collects on the walls of intake manifold 13 and forms a film on the walls. Both types of wall film are referred to hereafter as wall film.

Reference number 16 designates an engine control unit which has as its inputs the output signals of crankshaft angle sensor 6, lambda probe 19, hot film air mass sensor 15, and intake manifold pressure sensor 14. Engine control unit 16 is connected to a valve control unit 20 through a bus 17, for example a CAN bus. Engine control unit 16 is also connected to throttle valve 18, and controls the actuation of throttle valve 18.

From the input values enumerated above, engine control unit 16 determines control signals for throttle valve 18, fuel injector 12, spark plug 5 and for valve control unit 20. The control signals for valve control unit 20 are transmitted to valve control unit 20 through bus 17, and relate to an instant of opening and closing, an opening and closing speed and a lift of intake and exhaust valves 7 and 8.

Valve control unit 20 has the output signals of crankshaft angle sensor 6 and the control signals from engine control unit 16 as input values, which are transmitted through bus 17. As output signals, valve control unit 20 emits control signals for valve actuator 9 of intake valve 7 and for valve actuator 10 of exhaust valve 8 in such a way that intake valve 7 and exhaust valve 8 are opened and closed according to the control signals transmitted from engine control unit 16 to valve control unit 20.

Although in FIG. 1 a throttle valve is provided in intake manifold 13, the present invention is not limited to an internal combustion engine 1 having a throttle valve 18. Furthermore, the present invention is not limited to a non-supercharged internal combustion engine 1 having intake manifold injection, as shown in FIG. 1, but is also applicable without limitation to a multi-cylinder internal combustion engine 1 having direct fuel injection or turbocharging.

Figure 2:
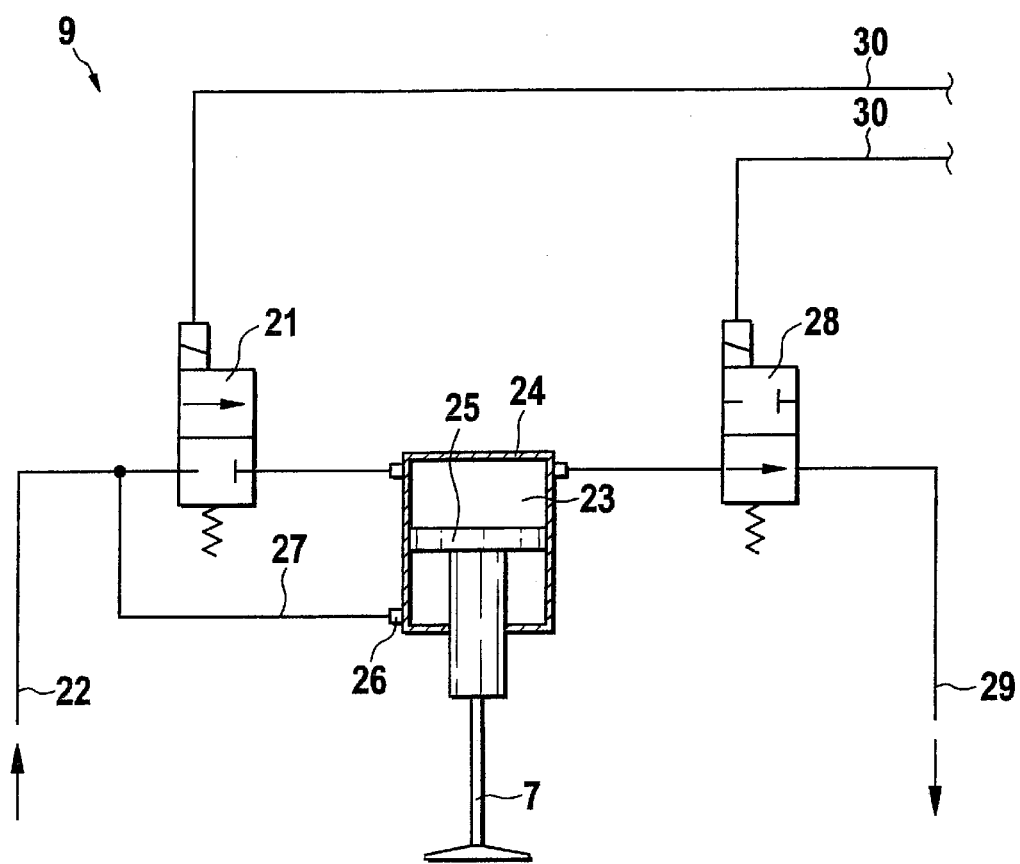
FIG. 2 shows a valve actuator.

The following section describes a construction and a manner of functioning of valve actuators 9 and 10 on the basis of valve actuator 9 for intake valve 7, with reference to FIG. 2. Although FIG. 2 shows an electro-hydraulic fully variable valve-gear assembly system as an example of fully variable valve-gear assembly, the present invention is not limited to that, but is applicable in the same way to all fully variable valve-gear assembly systems, such as for example electromagnetic valve-gear assembly. Furthermore, the invention is applicable to electromagnetic valve controllers, electro-hydraulic valve controllers, and mechanical controllers such as Vanos in combination with VVT.

Reference number 21 designates a first solenoid valve. First solenoid valve 21 is positioned in a hydraulic connection 22 between hydraulic pressure chamber 11 and a first chamber 23 in an actuating apparatus 24. A valve foot 25 of intake valve 7 is positioned in actuating apparatus 24. Valve foot 25 is rigidly connected to intake valve 7. Valve foot 25 is mounted in actuating apparatus 24 so that it is movable. Valve foot 25 separates the first chamber 23 from a second chamber 26 in actuating apparatus 24.

A second hydraulic connection 27 is provided between second chamber 26 in actuating apparatus 24 and hydraulic pressure chamber 11. First chamber 23 is also connected via a second solenoid valve 28 to hydraulic chamber 11 through a third hydraulic connection 29.

First solenoid valve 21 and second solenoid valve 28 are connected through lines 30 to valve control unit 20. Valve control unit 20 operates first solenoid valve 2 and second solenoid valve 28 using appropriate control signals. The valve control unit is preferably designed to operate all valve actuators of intake and exhaust valves 7 and 8 of internal combustion engine 1.

Valve actuator 9 depicted in FIG. 2 is operated as follows. When first solenoid valve 21 is open, a hydraulic medium under pressure flows from hydraulic pressure chamber 11 into first chamber 23. The hydraulic medium fills first chamber 23 and displaces valve foot 23, which separates first chamber 23 from second chamber 26. This moves intake valve 7 in FIG. 2 downward. Intake valve 7 is arranged so that intake valve 7 is seated in a valve seat (not shown) in a cylinder head of a cylinder of internal combustion engine 1 when the valve foot in FIG. 2 is in its uppermost position, i.e., there is no hydraulic medium in first chamber 23, so that first chamber 23 has minimum volume and second chamber 26 has maximum volume. In this position intake valve 7 closes the intake port of the combustion chamber of the cylinder. When first chamber 23 becomes filled with the hydraulic medium, intake valve 7 is moved out of the valve seat into the combustion chamber of the cylinder and the intake port of the cylinder is opened. When the valve is lifted a desired distance, first solenoid valve 21 is closed.

To close intake valve 7, second solenoid valve 28 is opened so that the hydraulic medium present in first chamber 23 may flow back though the opened second solenoid valve 28 to a collector (not shown). The hydraulic medium applied under pressure from hydraulic pressure chamber 11 to second chamber 26 then flows into second chamber 26, and thereby displaces valve foot 25 in FIG. 2 upward. That moves intake valve 7 back into the valve seat, and the intake port of the combustion chamber is closed. An opening and closing speed of intake valve 7 is controlled by the pressure with which hydraulic pressure chamber 11 feeds the hydraulic medium to valve actuator 9.

Valve actuators of this type make individual valve control possible for each outlet and intake valve 8 and 7 of internal combustion engine 1.

Figure 3:
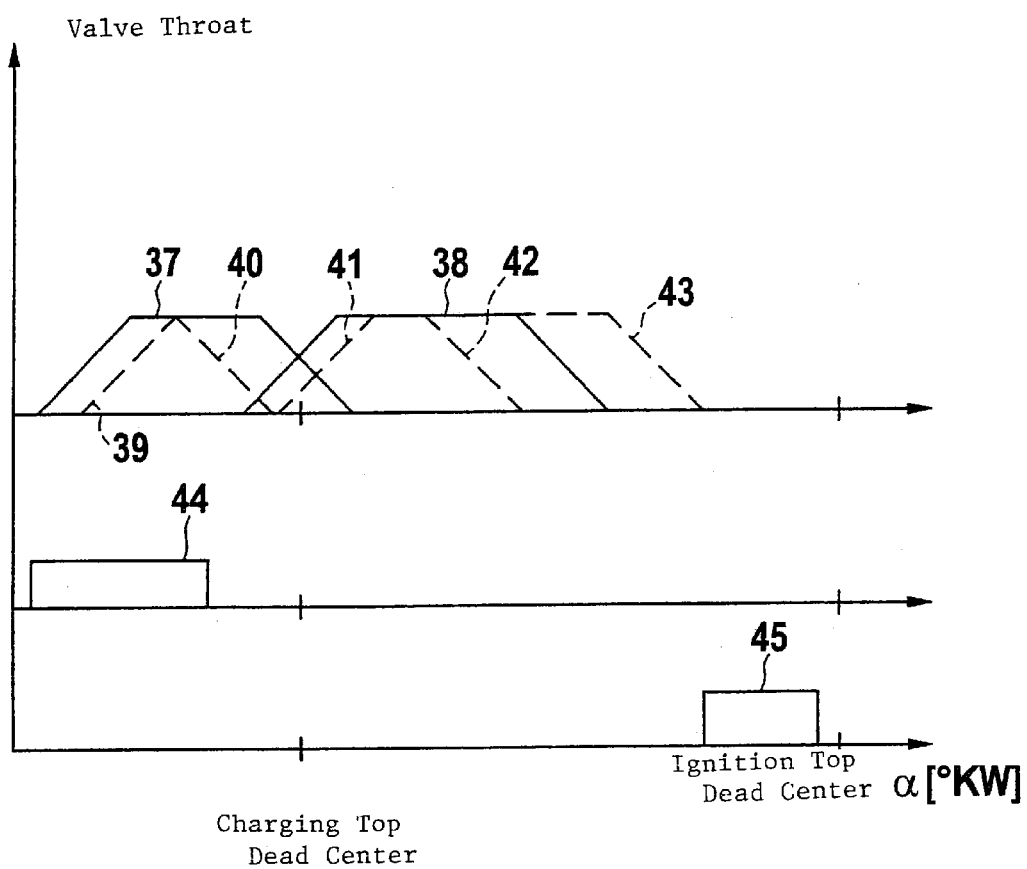
FIG. 3 shows various valve lifting curves of an intake valve and an exhaust valve, and a curve of control signals of a fuel injector and an ignition coil plotted against a crankshaft angle.

FIG. 3 shows a diagram of the valve lifting curves of an intake valve 7 and an exhaust valve 8 of a cylinder plotted against a crankshaft angle a, as they are implemented by engine control unit 16 by triggering valve control unit 20, and by valve control unit 20 by triggering first and second solenoid valves 21 and 28 of valve actuators 9 and 10. FIG. 3 also shows a curve of a control signal ti, which is designated with reference number 44, and a curve of a control signal zue of an ignition coil which applies the necessary ignition voltage to spark plug 5, which is designated with reference number 45.

Along the abscissas of the diagram in FIG. 3, the crankshaft angle a of internal combustion engine 1 is marked in crankshaft degrees. Along the ordinates of the diagram in FIG. 3 the valve lift of exhaust valve 8 and intake valve 7 of a cylinder of internal combustion engine 1 is marked, as well as amplitudes of the control signal ti of fuel injector 12 and of the control signal zue of the ignition coil of internal combustion engine 1.

Reference number 37 designates a solid line graph depicting a valve lifting curve of exhaust valve 8 of the cylinder. Reference number 38 designates a solid line graph depicting a valve lifting curve of intake valve 7 of the cylinder of internal combustion engine 1. Reference number 39 designates a dashed line depicting a change in valve lifting curve 37 of exhaust valve 8. Compared to valve lifting curve 37, in graph 39 the lifting angle of exhaust valve 8 is shifted backward, causing the indicated torque of the previous work cycle of this cylinder to be reduced. That makes a subsequent reduction of the indicated torque of the cylinder from the previous work cycle possible. This is also referred to as torque reduction.

Reference number 40 designates an additional possibility for changing valve lifting curve 37. Dashed line 40 depicts a valve lifting curve in which the dwell angle of exhaust valve 8 has been shifted forward in comparison to valve lifting curve 37. Shifting the dwell angle of exhaust valve 8 makes it possible to control an internal charge of residual gas in the cylinder. The internal charge of residual gas designates a volume of combustion exhaust gas from a previous combustion of the previous work cycle of this cylinder which was not expelled through exhaust valve 8 into the exhaust system, but remains in the combustion chamber of the cylinder for the coming combustion in the present work cycle. Reference number 41 designates a possible change in valve lifting curve 38 of intake valve 7. Dashed line 41 designates a change in valve lifting curve 38 to the effect that the lifting angle of intake valve 7 has been shifted backward. The backward shift of the intake valve lifting angle of intake valve 7, in combination with a shift of the dwell angle of exhaust valve 8, makes greater control of the charge of internal gas in the cylinder possible than with a shift of the dwell angle of exhaust valve 8 alone.

Graphs 42 and 43 shown additional possibilities for changing intake valve lifting curve 38. Dashed graph 42 depicts a forward shifting of the instant of closing of the intake valve, and dashed graph 43 depicts a backward shift of the instant of closing of the intake valve. It is possible to control the gas charge of the cylinder by changing the instant of closing of the intake valve. The valve lifting curves depicted in FIG. 3 are implemented by valve control unit 20 by appropriate triggering of valve actuators 9 and 10 of corresponding intake valve 7 and corresponding exhaust valve 8, as explained on the basis of FIG. 2.

Reference number 44 designates a curve of a control signal ti of fuel injector 12. As may be seen from FIG. 3, before intake valve 7 opens, fuel injector 12 is triggered so that it is opened and closed before intake valve 7 opens. The time between the closing of fuel injector 12 and the opening of intake valve 7 is referred to as "maximum permitted flight time," or "flight time" for short. The flight time designates the time which is necessary after injection by fuel injector 12 for the fuel to be transported though a section of intake manifold 13 and admitted through intake valve 7 into the combustion chamber.

Reference number 45 designates a curve of a control signal zue of an ignition coil of internal combustion engine 1. As may be seen from FIG. 3, the amplitude of control signal zue is zero except for an angle prior to ignition top dead center. In the angle prior to ignition top dead center, the ignition coil is triggered by control signal zue in such a way that it provides the ignition voltage to spark plug 5 at the necessary instant.

FIG. 3 also depicts the time context in which intake valve 7 and exhaust valve 8 are to be opened and closed and fuel injector 12 and the ignition coil are to be actuated. As may be seen from FIG. 3, the process of injection into the cylinder begins with fuel injector 12 being energized by control signal ti. The length of control signal ti, and hence the length of time the fuel injector is open, determines the quantity of fuel injected into intake manifold 13 of internal combustion engine 1. The angle or the torque at which the fuel injector ceases injecting is preferably fixed, so that the beginning of injection, and thus the beginning of actuation of fuel injector 12, determines the volume of fuel stored up. An angular distance between the closing of intake valve 12 and the closing of exhaust valve 7 must be sufficient so that when allowance is made for the flight time of the injected fuel after fuel injector 12 is shut off the spray-discharged fuel may still be aspirated into the combustion chamber of the cylinder.

A short angular distance after current is applied to fuel injector 12 by control signal ti, exhaust valve 8 of internal combustion engine 1 is opened, as shown by graph 37, which depicts the valve lifting curve of exhaust valve 8. The instant of opening or the lifting angle of exhaust valve 8 affects primarily the induced torque of the previous work cycle. Changing the lifting angle makes possible a retroactive reduction of a torque contribution by the cylinder in the previous work cycle to the torque of internal combustion engine 1. When the exhaust valve is opened very early, the combustion energy is not converted optimally to kinetic energy. As was explained on the basis of FIG. 2, valve control unit 20 controls the opening of the exhaust valve by applying current to first solenoid valve 21 of valve actuator 10 of exhaust valve 8. The lift of the exhaust valve is determined by the length of the triggering pulse of first solenoid valve 21.

The instant of closing of exhaust valve 8 is produced by valve control unit 20 by triggering second solenoid valve 28 of valve actuator 10 of exhaust valve 8. The instant of closing of the exhaust valve influences an internal residual gas charge of the cylinder, i.e., a quantity of residual gas from a previous combustion in the cylinder which is not expelled through the outlet port into the exhaust system, but remains in the combustion chamber of the cylinder for the subsequent combustion.

It may also be seen from FIG. 3 that time specifications for the injection, i.e., in particular the beginning and end of injection in the work cycle, must be set early. This is especially true at high rotational speeds, where the duration of injection may cover an angle sector of several hundred degrees over the crankshaft angle. It is also evident that if the desired end of injection is not set to the latest possible instant, i.e., shortly before the intake valve closes, allowing for the flight time of the fuel, the quantity of fuel injected may be increased by prolonging the injection, by shifting the end of injection to a later time. However, once fuel has been atomized it can no longer be retracted. An early beginning of injection thus limits high dynamics in reducing the quantity of fuel to achieve reduced torque.

The instant of opening of exhaust valve 8 must also be determined. The lift of exhaust valve 8 is defined by the instant of opening of the exhaust valve. The lift is defined in such a manner that the lift of exhaust valve 8 is sufficiently great so that with a given charge and rotational speed of internal combustion engine 1 complete discharge of the residual gas from the combustion is possible.

Internal recirculation of exhaust gas is implemented by coordinating the instant of closing of exhaust valve 8 and the instant of opening of intake valve 7. That determines the internal charging of the cylinder with residual gas.

Another critical controlling variable is the lift of intake valve 7. In combination with the instant of closing of intake valve 7, the instant of lift of intake valve 7 determines a speed of inflow of the gas mixture from intake manifold 13 into the combustion chamber of the cylinder.

The instant of closing of intake valve 7 in combination with the lift of the intake valve and the intake manifold pressure in intake manifold 13 influences in particular the charging of the cylinder with fresh air. The last event in FIG. 3 is the charging of the ignition coil by control signal zue. At high rotational speeds an earlier start of the charging may be necessary. The instant of ignition is defined by the end of charging of the ignition coil.

Control signal ti of the fuel injector is applied directly by engine control unit 16 to fuel injector 12. Control signal zue of the ignition coil is applied directly by engine control unit 16 to the ignition coil of internal combustion engine 1.

Now, with reference to FIG. 4, a further description will be given of one exemplary embodiment of engine control unit 16, the transmission of control signals from engine control unit 16 through bus 17 to valve control unit 20, and the triggering of valve actuators 9 and 10 by valve control unit 20.

Figure 4:
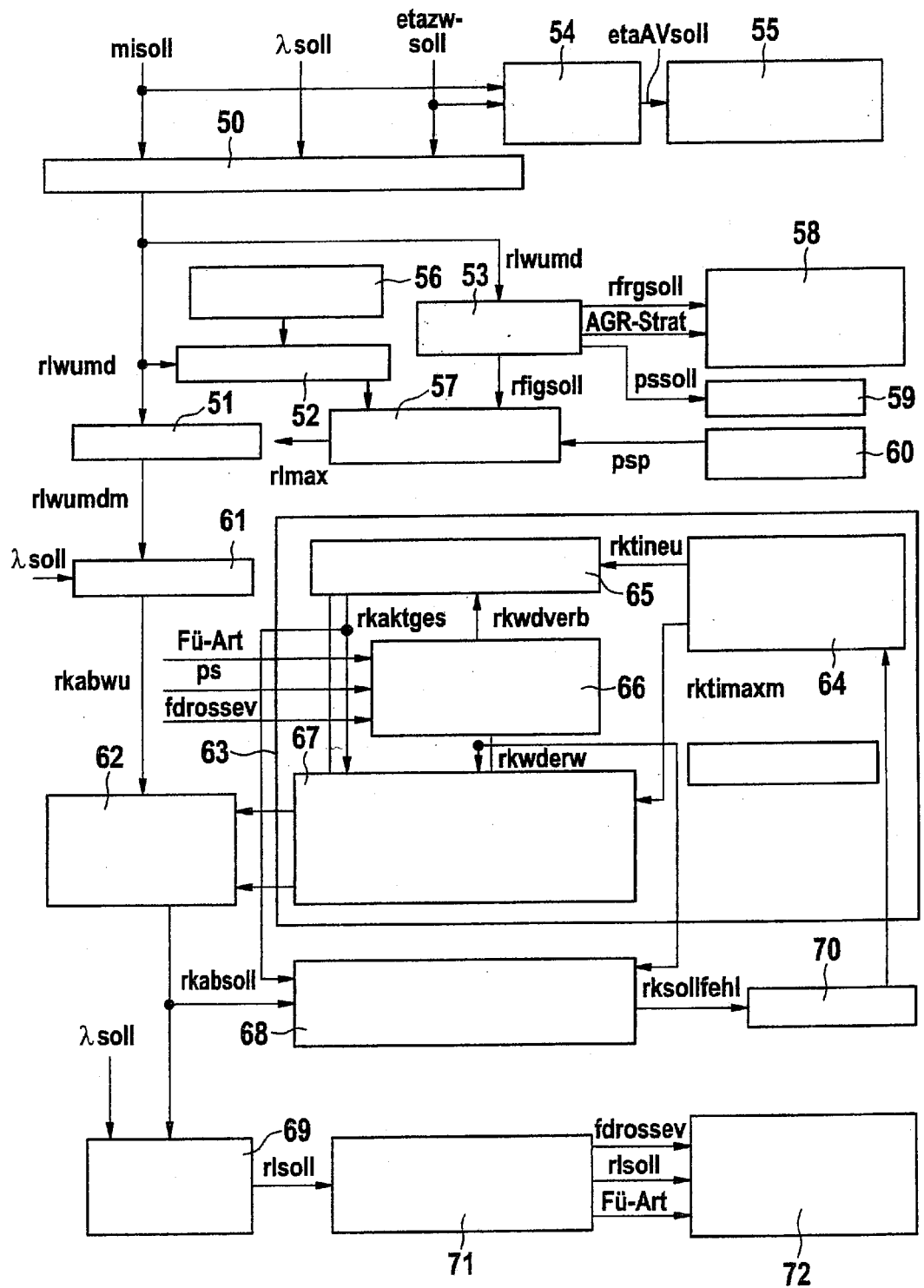
FIG. 4 shows an exemplary embodiment of the engine control unit of FIG. 1.
Figure 6:
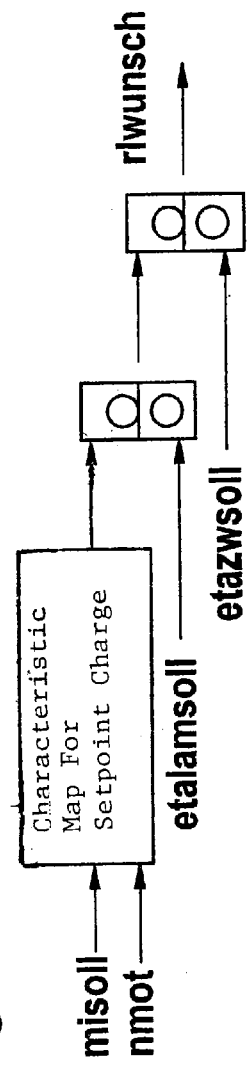
FIG. 6 shows a known conversion of induced setpoint torques into desired fresh air charges, with attention to lambda efficiencies and spark angle efficiencies.

Reference number 50 in FIG. 4 designates a desired charge determination device. Desired charge determination device 50 calculates a desired charge rlwumd for a cylinder of internal combustion engine 1 from a setpoint torque misetpoint, a setpoint lambda of the combustion λsetpoint, and a setpoint spark angle efficiency etazwsetpoint. The desired charge rlwumd designates a gas charge of a cylinder in a work cycle. The gas charge is made up of fresh air and possibly residual gas from a previous combustion. The setpoint torque of internal combustion engine 1 designates an induced torque which is specified by a power specification device such as a gas pedal in a motor vehicle and is output to desired charge determination device 50. The setpoint lambda of the combustion λsetpoint is a value which is set in engine control unit 16 with regard to a lean, a rich or a stoichiometric operating condition of internal combustion engine 1. The setpoint spark angle efficiency etazswsetpoint designates the influence of the setpoint spark angle of a cylinder relative to the crankshaft angle of internal combustion engine 1 on the conversion of chemical energy to kinetic energy. The setpoint spark angle efficiency is varied by engine control unit 16, as a function for example of the speed of internal combustion engine 1 or a sensed knocking. Desired charge determination device 50 determines the desired charge rlwumd in the same manner as Bosch engine controller ME7, as was described on the basis of FIG. 6. Desired charge determination device 50 outputs the desired charge rlwumd to a first minimum determination device 51, a lift estimation device 52 and a setpoint EGR charge and setpoint intake manifold pressure determination device 53.

Reference number 54 designates a torque reduction device for torque reduction through early opening of the exhaust valve (AV). Torque reduction device 54 determines a setpoint exhaust valve high pressure efficiency etaAVsetpoint on the basis of the setpoint torque misetpoint and the setpoint spark angle efficiency etzwetzwsetpoint. Torque reduction device 54 outputs the setpoint high pressure efficiency etaAVsetpoint to a first transmission device 55, which transmits the setpoint high pressure efficiency etaAVsetpoint to valve control unit 20 at a first synchronization instant Synchro 1. Valve control unit 20 determines an outlet opening instant for exhaust valve 8 of the cylinder on the basis of the setpoint high pressure efficiency etaAVsetpoint and triggers first solenoid valve 21 of valve actuator 10 accordingly. In this way, by opening exhaust valve 8 early, a high pressure operation in the cylinder may be reduced by releasing pressure from the cylinder through the outlet port into the exhaust system. In this way a torque contribution of this cylinder to the torque of internal combustion engine 1, and hence the torque of internal combustion engine 1, is reduced. For this reason the setpoint high pressure efficiency etaAVsetpoint is also designated as a setpoint value in relation to a torque reduction of the cylinder.

The transmission of first transmission device 55 takes place in synchronization with a first crankshaft-anglesynchronous synchronization pattern of engine control unit 16. This first crankshaft-angle-synchronous synchronization pattern is determined by engine control unit 16 on the basis of the output signal from crankshaft angle sensor 6. The first crankshaft-angle-synchronous synchronization pattern exhibits at least first synchronization instant Synchro 1, a second synchronization instant Synchro 2, a third synchronization instant Synchro 3, a fourth synchronization instant Synchro 4, a fifth synchronization instant Synchro 5, a sixth synchronization instant Synchro 6, and a seventh synchronization instant Synchro 7. Engine control unit 16 determines the synchronization instants in such a way that first synchronization instant Synchro 1 is a predefined angle prior to ignition top dead center of the corresponding cylinder of internal combustion engine 1. This predefined angle is for example 72 crankshaft degrees prior to ignition top dead center of the corresponding cylinder of internal combustion engine 1. Synchronization instants Synchro 1 through Synchro 7 exhibit an interval from each other of an additional predefined angle. This additional predefined angle, in the 4-cylinder internal combustion engine of the present exemplary embodiment, is preferably 180 crankshaft degrees. For internal combustion engines having more cylinders, this interval must be adjusted accordingly. For an internal combustion engine 1 having n cylinders, this predefined angle is preferably 720°/n. The transmission of data by transmission device 55 via bus 17 to valve control unit 20 takes place in synchronization with the current crankshaft-angle-synchronous synchronization pattern of engine control unit 20. In other words, this means that the data transmission takes place in each case at synchronization instants Synchro 1 through Synchro 7, and may still be taken into account for the next cylinder to be fired.

Upon receipt of the setpoint high pressure efficiency etaAVsetpoint in valve control unit 20 at a first synchronization instant Synchro 1 of a second synchronization pattern of valve control unit 20, valve control unit 20 determines the instant of opening of exhaust valve 8 on the basis of the setpoint high pressure efficiency etaAVsetpoint and triggers valve actuator 10 of exhaust valve 8 accordingly.

Lift estimation device 52 determines an estimated maximum lift of intake valve 7 and exhaust valve 8 which may be achieved using valve actuators 9 and 10. Lift estimation device 52 determines the estimated maximum lift on the basis of an output signal from a hydraulic medium pressure determination device 56 in valve control unit 20, which is transmitted via bus 17 to engine control unit 16. Hydraulic medium pressure determination device 56 determines the output signal transmitted to engine control unit 16 on the basis of a current hydraulic medium pressure in pressure supply device 11. This output signal is transmitted by valve control unit 20 in synchronization with the second crankshaft-angle-synchronous synchronization pattern of valve control unit 20.

The second crankshaft-angle-synchronous synchronization pattern of valve control unit 20 corresponds to the first synchronization pattern of engine control unit 16, except that the second synchronization pattern trails the first synchronization pattern by a predefined angle. The angle by which the second crankshaft-angle-synchronous synchronization pattern of valve control unit 20 trails the first crankshaft-angle-synchronous synchronization pattern of the engine control unit may be determined by the fact that a transmission time for the corresponding signals via bus 17 is less than the predefined angle between the first synchronization pattern and the second synchronization pattern even at the maximum speed of internal combustion engine 1. That ensures that the transmitted signals are received at valve control unit 20 at exactly the predefined angle after being sent by engine control unit 16; valve control unit 20 thereupon determines control signals for first and second solenoid valves 21 and 28 of valve actuators 9 and 10 of intake and exhaust valves 7 and 8. In the present exemplary embodiment, this predefined angle is preferably 90°. In an internal combustion engine 1 having n cylinders, this predefined angle is preferably 720°/(2*n). Valve control unit 20 determines the second synchronization pattern on the basis of the output signal of crankshaft angle sensor 6.

Lift estimation device 52 emits a signal which is an estimate relating to the maximum lift of intake valve 7 and exhaust valve 8 and is forwarded to a fresh gas charge maximum value determination device 57.

Setpoint exhaust gas recirculation (EGR) charge and setpoint intake manifold pressure determination device 53 determines on the basis of the desired charge rlwumd, whose implementability at the next aspiration is still uncertain at this instant, a setpoint value for the internal residual gas charge rfrgsetpoint corresponding to the operating condition of internal combustion engine 1. In addition, setpoint EGR charge and setpoint intake manifold pressure determination device 53 determines a residual gas control strategy EGR-Strat which matches the operating condition of internal combustion engine 1. Setpoint EGR charge and setpoint intake manifold pressure determination device 53 transmits the internal residual gas charge rfrgsetpoint and the residual gas control strategy EGR-Strat to a second transmission device 58.

Second transmission device 58 transmits the internal residual gas charge rfrgsetpoint and the residual gas control strategy EGR-Strat to valve control unit 20. This transmission takes place for the current cylinder for the first time at the fifth synchronization instant Synchro 5 before the corresponding synchronization pattern of the cylinder. If second transmission device 58 registers that at the fourth synchronization instant Synchro 4 which follows the fifth synchronization instant Synchro 5 there is an internal residual gas charge rfrgsetpoint and/or a residual gas control strategy EGR-Strat at its input which is changed from the fifth synchronization instant Synchro 5, second transmission device 58 transmits the changed or updated internal residual gas charge rfrgsetpoint and/or the changed or updated residual gas control strategy EGR-Strat at the fourth synchronization instant Synchro 4 to valve control unit 20. In this way, second transmission device ensures that a second transmission of these values via bus 17 to valve control unit 20 takes place only when the internal residual gas charge rfrgsetpoint or the residual gas control strategy EGR-Strat has been changed or updated. This guarantees a minimal data transmission rate together with the best possible updating via bus 17.

After the setpoint values of the internal residual gas charge rfrgsetpoint and the residual gas control strategy EGR-Strat have been received at the fourth and/or fifth synchronization instant Synchro 4/5 of the second synchronization pattern of valve control unit 20, valve control unit 20 determines the instant of closing of exhaust valve 8 and the instant of opening of intake valve 7 on the basis of the setpoint values of the internal residual gas rfrgsetpoint and of the residual gas control strategy EGR-Strat, and triggers second solenoid valve 28 of valve actuator 10 of exhaust valve 8 and first solenoid valve 21 of valve actuator 9 of intake valve 7 accordingly.

Setpoint EGR charge and setpoint intake manifold pressure determination device 53 also determines on the basis of the desired charge rlwumd a setpoint value pspssetpoint for the intake manifold pressure in intake manifold 13, and conveys the setpoint value pssetpoint to a throttle valve triggering device 59, which triggers throttle valve 18 in intake manifold 13 of internal combustion engine 1 on the basis of the setpoint value pssetpoint.

Setpoint EGR charge and setpoint intake manifold pressure determination device 53 also determines on the basis of the desired charge rlwumd an inert gas setpoint value rfigrfigsetpoint for the subsequent gas charge of the cylinder, and outputs this value to fresh gas charge maximum value determination device 57.

Reference number 60 designates an intake manifold pressure prediction device which determines an estimate of the intake manifold pressure psp at the instant of closing of intake valve 7. This estimated intake manifold pressure psp is read from a characteristic map in intake manifold pressure prediction device 60, preferably on the basis of the instant of closing of intake valve 7 and the rotational speed of internal combustion engine 1. The estimate of the intake manifold pressure psp is output to fresh gas charge maximum value determination device 57.

Fresh gas charge maximum value determination device 57 determines a maximum fresh air charge rlmax to be implemented in the cylinder in the next work cycle. Fresh gas charge maximum value determination device 57 determines the maximum implementable fresh air charge rlmax on the basis of the output signal from lift estimation device 52, the inert gas setpoint value rfigsetpoint which is output by setpoint EGR charge and setpoint intake manifold determination device 53, and the estimate of the intake manifold pressure psp which is output by intake manifold pressure prediction device 60. Fresh gas charge maximum value determination device 57 determines the maximum implementable fresh air charge rlmax preferably by reading the maximum implementable fresh air charge rlmax from a characteristic map on the basis of the input values of fresh gas charge maximum value determination device 57. Fresh gas charge maximum value determination device 57 outputs the maximum implementable fresh air charge rlmax to first minimum determination device 51.

First minimum determination device 51 determines a possible desired charge rlwumdm, allowing for the maximum implementable fresh air charge rlmax and the desired charge rlwumd. First minimum determination device 51 determines the implementable or possible desired charge rlwumdm, by determining which of the two input values rlwumd and rlmax is smaller. It then outputs the smaller of the desired charge rlwumd and the maximum implementable fresh air charge rlmax as the possible desired charge rlwumdm to a first determination device 61.

First determination device 61 determines a desired value for fuel to be aspirated rkabwu from the possible desired charge rlwumdm and the desired setpoint lambda of the combustion λsetpoint. Instead of the value λsetpoint used in FIG. 4 for the desired lambda of the combustion, the desired lambda efficiency etalamsetpoint may also be used.

First determination device 61 outputs the desired value for the fuel to be aspirated rkabwu to a second determination device 62. The desired value of the fuel to be aspirated rkabwu indicates what quantity of the fuel injected into intake manifold 13 is to be aspirated into the cylinder in the aspiration process.

Reference number 63 designates a fuel determination device. Fuel determination device 63 includes an injection monitoring device 64, a second determination device 65, a wall film determination device 66, a third determination device 67 and a fourth determination device 68.

Fuel determination device 63 determines a minimum quantity of fuel rkabmin aspirated in a subsequent aspiration from intake manifold 13 of internal combustion engine 1, and a maximum quantity of fuel rkabmax aspirated in the subsequent aspiration from intake manifold 13 of internal combustion engine 1. The minimum quantity of fuel to be aspirated rkabmin and the maximum quantity of fuel rkabmax to be aspirated from intake manifold 13 of internal combustion engine in the subsequent aspiration define a range of the quantity of fuel which may be present in the combustion chamber of the cylinder at the next aspiration. The design and the manner of functioning of fuel determination device 63 are described below.

Fuel determination device 63 includes injection quantity determination device 64, which is connected to second determination device 65 and a third determination device 67. Also provided is wall film determination device 66, which is connected to second determination device 65 and third determination device 67. Second determination device 65 is likewise connected to third determination device 67.

Injection quantity determination device 64 determines, on the basis of control signal ti of fuel injector 12 of the cylinder of internal combustion engine 1, a quantity of fuel rktineu injected into intake manifold 13 of the cylinder since a previous closing of intake valve 7 (in the previous work cycle), and a quantity of fuel rktimaxm still to be injected until fuel injector 12 closes. In other words, the fuel quantity rktineu indicates the quantity of fuel currently spray discharged through fuel injector 12 into intake manifold 13 after the last time intake valve 7 closed, and the fuel quantity rktimaxm indicates the quantity of fuel which may still be spray discharged before fuel injector 12 closes, allowing for the flight time of the fuel. Injection quantity determination device 64 outputs fuel quantity rktineu to second determination device 65 and outputs fuel quantity rktimaxm to third determination device 67.

Wall film determination device 66 determines, on the basis of a charge type Fü-Art with which the cylinder of internal combustion engine 1 is operated, an actual value ps for the intake manifold pressure in intake manifold 13 of internal combustion engine 1, which is determined by intake manifold pressure sensor 14, and a factor fdrossev for the throttling of the internal combustion engine when the charge is being controlled, a wall film rkwtverb remaining in intake manifold 13 of the cylinder after previous closing of intake valve 7, and a wall film rkwderw to be expected after a coming closing of intake valve 7 of the cylinder. Charge type Fü-Art of internal combustion engine 1 indicates whether the cylinder is operated for example using an early charging strategy or with a late charging strategy. In the case of the early charging strategy, intake valve 7 of the cylinder is closed as soon as the desired cylinder charge or gas charge is reached. If a cylinder charge is then desired for example (charging with fresh air and residual gas) which corresponds to half the combustion chamber of the cylinder, the intake valve is closed for example at 90 crankshaft degrees after top dead center of the charge cycle, i.e., approximately halfway between top dead center of the charge cycle and the following bottom dead center in the early charging strategy. In the late charging strategy, a larger cylinder charge than actually desired is aspirated into the cylinder. The excess cylinder charge is expelled again through the intake port during the upward movement of the piston from the bottom dead center of the charge cycle, until only the desired charge is present in the cylinder. Then intake valve 7 is closed. If the cylinder charge is then desired which corresponds to half the combustion chamber of the cylinder, the intake valve is then closed at 270 crankshaft degrees after top dead center of the charge cycle, i.e., approximately halfway between bottom dead center of the charge cycle and the following top dead center of ignition in the late charging strategy. The charging strategy is specified by a charging strategy setting device 71 and is transmitted to wall film determination device 66.

Factor fdrossev for throttling when charging is being controlled is a ratio relating to the reduction of the charge through reduction of the lift of intake valve 7 compared to a reduction of the charge of the combustion chamber of the cylinder through early closing of intake valve 7. Factor fdrossev is determined by a charge strategy setting device 71 in engine controller 16.

Wall film determination device 66 outputs wall film rkwdverb remaining in intake manifold 13 of the cylinder after the previous closing of intake valve 7, which indicates the quantity of fuel still present in intake manifold 13, to second determination device 65. Wall film determination device 66 also outputs wall film rkwderw to be expected after the coming closing of intake valve 7 of the cylinder, which indicates the quantity of fuel which may be expected to remain in intake manifold 13 as wall film, to third determination device 67. Furthermore, wall film determination device 66 outputs wall film rkwderw to be expected after the coming closing of intake valve 7 of the cylinder to a fourth determination device 68.

Second determination device 65 determines a total quantity of fuel currently stored rkaktges and outputs it to third determination device 67. Second determination device 65 also outputs the total quantity of fuel currently stored rkaktges to a fourth determination device 68. Second determination device 65 determines the total quantity of fuel currently stored rkaktges by adding together the wall film rkwdverb remaining in intake manifold 13 of the cylinder after the previous closing of intake valve 7, output by wall film determination device 66, and the quantity of fuel rktineu spray discharged through the fuel injector, currently output by injection determination device 64 after the last closing of the intake valve:

$$rkaktges=rkwdverb+rktineu.$$

Third determination device 67 determines the maximum quantity of fuel which may be aspirated rkabmax by adding together the total currently stored fuel rkatges and the quantity of fuel rktimaxm which may be injected until fuel injector 14 is closed, followed by subtraction of wall film rkwaderw to be expected after the coming closing of intake valve 7 of the cylinder:

$$rkabmax=rkaktges+rktimaxm-rkwderw.$$

Third determination device 67 also determines the minimum quantity of fuel which may be aspirated, by subtracting wall film rkwderw to be expected after the coming closing of intake valve 7 from the total currently stored quantity of fuel rkaktges:

$$rkabmin=rkaktges-rkwderw.$$

On the basis of the desired value of the quantity of fuel aspirated rkabwu, the maximum quantity of fuel which may be aspirated rkabmax, and the minimum quantity of fuel which may be aspirated rkabmin, second determination device 62 determines a setpoint value for the quantity of fuel aspirated rkabsetpoint. This quantity of fuel rkabsetpoint, like the corresponding fresh air charge of the cylinder, is implementable at the next aspiration. For this purpose, second determination device 62 determines which of the two following values is greater: the desired value of the quantity of fuel aspirated rkabwu, or the minimum quantity of fuel which may be aspirated rkabmin. The greater of the two fuel quantities rkabwu and rkabmin is then compared to the maximum quantity of fuel which may be aspirated rkabmax. The smaller fuel quantity in this comparison is set equal to the setpoint value of the quantity of fuel aspirated rkabsetpoint. In summary, second determination device 62 performs the following calculation:

$$rkabsetpoint=MIN\ [rkabmax,\ MAX\ (rkabwu,\ rkabmin)].$$

Second determination device 62 outputs the setpoint value for the quantity of fuel aspirated rkabsetpoint to fourth determination device 68 and a setpoint charge determination device 69.

Fourth determination device 68 determines a quantity of fuel rksetpointfehl which still needs to be delivered, i.e., injected, after the coming synchronization instant Synchro 1. Fourth determination device 68 determines the quantity of fuel still to be injected by adding together the setpoint value of the quantity of fuel aspirated rkabsetpoint from second determination device 62 with wall film rkwderw to be expected after the coming closing of intake valve 7, followed by subtracting the total quantity of fuel currently stored rkaktges determined by second determination device 65. In summary, fourth determination device 68 performs the following calculation:

$$rksetpointfehl=rkabsetpoint+rkwderw-rkaktges.$$

Fourth determination device 68 outputs the quantity of fuel rksetpointfehl still to be injected after the following synchronization instant for the next charge to a fuel injector control device 70. Fuel injector control device 70 determines control signal ti for fuel injector 12 on the basis of the output signal of fourth determination device 68. Fuel injector control device 70 outputs control signal ti to fuel injector 12 and injection quantity determination device 64.

Setpoint charge determination device 69 determines the setpoint fresh gas charge rlsetpoint of the cylinder on the basis of the setpoint value of the setpoint lambda of the combustion λsetpoint and the setpoint value of the quantity of fuel aspirated rkabsetpoint. The setpoint fresh gas charge rlsetpoint of the cylinder designates one charge of the cylinder with fresh air. Preferably, setpoint charge determination device 69 reads the setpoint fresh gas charge rlsetpoint from a characteristic map on the basis of the input values λsetpoint and rkabsetpoint. Setpoint charge determination device 69 outputs the setpoint fresh gas charge rlsetpoint to charging strategy setting device 71.

Charging strategy setting device 71 sets the early or late charging strategy for the cylinder through early or late closing of intake valve 7, or sets a mixing strategy by setting an early or late intake valve closing instant in combination with a reduced lift of intake valve 7. Charging strategy setting device 71 determines factor fdrossev for throttling during the control of the charging corresponding to the charging strategy, and an output signal Fü-Art corresponding to the charging strategy, and outputs factor fdrossev, charge type Fü-Art and setpoint fresh gas charge rlsetpoint to a third transmission device 72. Charging strategy setting device 71 also outputs factor fdrossev for throttling and charge type Fü-Art to wall film determination device 66. The filling strategy is preferably predefined in charging strategy setting device 71.

Third transmission device 72 transmits factor fdrossev, setpoint fresh gas charge rlsetpoint and charge type Fü-Art at fifth synchronization instant Synchro 5 of engine control unit 16 to valve control unit 20. At the following synchronization instant, namely third synchronization instant Synchro 3, third transmission device 72 compares setpoint fresh gas charge rlsetpoint transmitted to control apparatus 20 at fourth synchronization instant Synchro 4 with a setpoint fresh gas charge rlsetpoint present at third transmission device 72 at third synchronization instant Synchro 3. If setpoint fresh gas charge rlsetpoint which is present at third transmission device 72 at third synchronization instant Synchro 3 differs from setpoint fresh gas charge rlsetpoint which was transmitted to valve control unit 20 at fourth synchronization instant Synchro 4, third transmission device 72 transmits setpoint fresh gas charge rlsetpoint present at third transmission device 72 at third synchronization instant Synchro 3 to valve control unit 20. If setpoint fresh gas charges rlsetpoint at third and fourth synchronization instants Synchro 3 and Synchro 4 do not differ, no transmission to valve control unit 20 takes place. That guarantees a minimal data transmission rate on bus 17.

When factor fdrossev, setpoint fresh gas charge rlsetpoint and charge type Fü-Art are received, at fourth synchronization instant Synchro 4 of the second synchronization pattern of valve control unit 20, valve control unit 20 determines the setpoint lift of intake valve 7 and ends the triggering of first solenoid valve 21 of valve actuator 9 of intake 7 accordingly. Furthermore, after receiving factor fdrossev, setpoint fresh gas charge rlsetpoint and charge type Fü-Art, intake valve control unit 20 determines a closing instant for intake valve 7 at third synchronization instant Synchro 3 of valve control unit 20, and triggers second solenoid valve 28 of valve actuator 9 of intake valve 7 accordingly.

Although first transmission device 55, second transmission device 58 and third transmission device 72 are implemented as individual transmission devices in this exemplary embodiment, it is also possible to design first, second and third transmission devices 55, 58 and 72 using one transmission device.

The output variables determined in desired charge determination device 50, lift estimation device 52, setpoint EGR charge and setpoint intake manifold pressure determination device 53, torque reduction device 54 and throttle valve triggering device 59—which are designated below as general output variables—are equally valid for all four cylinders of internal combustion engine 1. The methods described above for determining the output variables of desired charge determination device 50, lift estimation device 52, setpoint EGR charge and setpoint intake manifold determination device 53, torque reduction device 54 and throttle valve triggering device 59 to determine the general output variables are carried out at each synchronization instant Synchro 1 through Synchro 7 of the first synchronization pattern of engine control unit 16, so that the output variables of these devices are recalculated at each synchronization instant Synchro 1 through Synchro 7 of the first synchronization pattern of engine control unit 16.

The output variables of first minimum determination device 51, fresh gas charge maximum value determination device 57, intake manifold pressure prediction device 60, first determination device 61, second minimum determination device 62, injection quantity determination device 64, second determination device 65, wall film determination device 66, third determination device 67, fourth determination device 68, fuel injector control device 70, setpoint charge determination device 69 and charging strategy setting device 71 are determined by individual cylinder, i.e., individually for each of the four cylinders of internal combustion engine 1. These output variables are designated below as individual output variables. The individual output variables are calculated up to five times at the following synchronization instants, depending on the operating state of internal combustion engine 1.

In an operating state in which internal combustion engine 1 is operated under full load at high speed, the individual output variables are calculated as follows: The individual output variables are calculated for the first time at seventh synchronization instant Synchro 7, since this is the earliest possible beginning of injection under full load at high speed. The second time, individual output variables are calculated at sixth synchronization instant Synchro 6, since under full load and at high speed the beginning of injection is updated at this instant. The third time, individual output variables are determined at fifth synchronization instant Synchro 5, since at fifth synchronization instant Synchro 5 the setpoint value of the internal residual gas rfrgsetpoint, i.e., the internal charge of residual gas, is determined. The individual output variables are determined a fourth time at fourth synchronization instant Synchro 4, since at fourth synchronization instant Synchro 4 setpoint fresh gas charge rlsetpoint of the cylinder is determined and a new updated setpoint value of internal residual gas rfrgsetpoint is determined. In addition, the individual output variables are calculated a fifth time at third synchronization instant Synchro 3, at which time a new setpoint fresh gas charge rlsetpoint is determined.

If internal combustion engine 1 is not operated under full load and at high speed, the individual output variables are calculated the first time at sixth synchronization instant Synchro 6, since in this operating condition the beginning of injection is determined for the first time at this instant.

The described determination of the individual output variables is performed in such a way that all of the values are determined in the listed order, from seventh synchronization instant Synchro 7 to fourth synchronization instant Synchro 4. Then at fourth synchronization instant Synchro 4 setpoint fresh gas charge rlsetpoint is transmitted via bus 17 to valve control unit 20. Only after setpoint fresh gas charge rlsetpoint is transmitted, is another current setpoint fresh gas charge rlsetpoint then calculated at third synchronization instant Synchro 3.

In the case of an engine having multiple cylinders, the values must be calculated in advance for each individual cylinder. The computer sequence begins preferentially at Synchro 3 and ends at Synchro 7. As described, up to 7 synchros must be calculated in advance for each cylinder. Synchro 3 is the name of the calculation of the values which are to be applied in the work cycle of the cylinder 3 synchros later. Corresponding to this computing sequence, the procedure should start with the synchro nearest in time, in order to be able to send the values needed in the immediate future "on their way." After the fourth synchro in the future, for example, the charge for the associated cylinder is sent.

FIG. 4 shows a diagram explaining the output signal transmission from first signal transmission device 55, second signal transmission device 58 and third signal transmission device 57 in engine control unit 16 to valve control unit 20.

Figure 5:
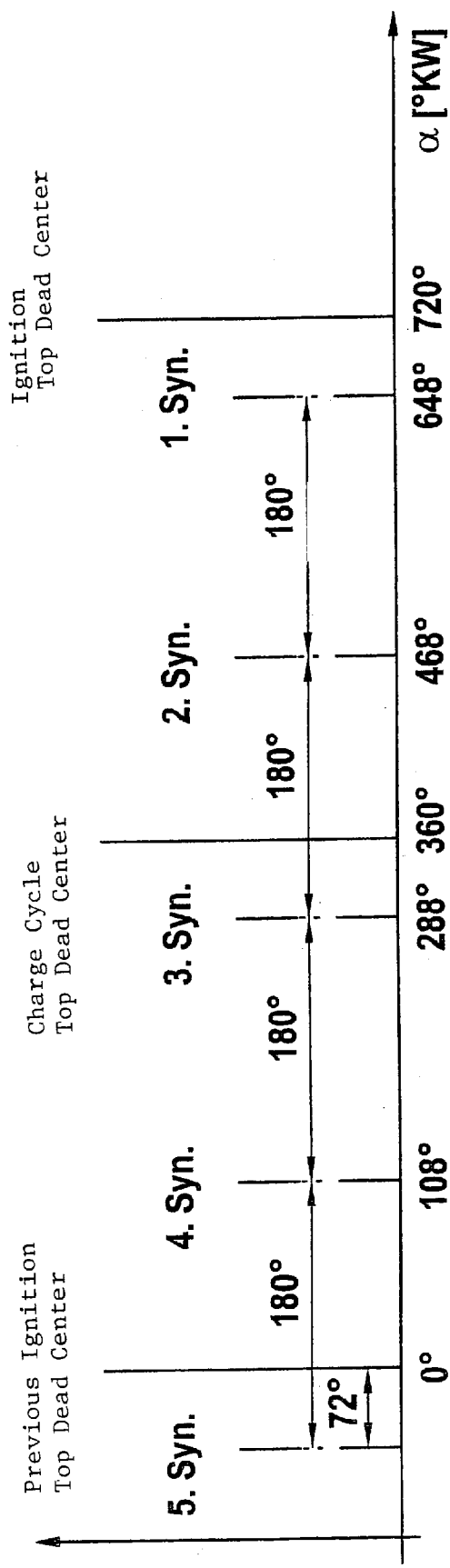
FIG. 5 shows a diagram to explain a transfer of data between the engine control unit and the valve control unit of FIG. 1.

Along the abscissa of FIG. 5, the crankshaft angle α crankshaft degrees is marked for a work cycle from a preceding ignition bottom dead center at 0° to the ignition bottom dead center of this work cycle at 720 crankshaft degrees. Also marked in Diagram 5 are synchronization instants Synchro 1 through Synchro 5 of the synchronization pattern of engine control unit 16. Fifth synchronization instant Synchro 5 is marked 72 crankshaft degrees ahead of the previous ignition top dead center at 0 crankshaft degrees. At the interval of 180 crankshaft degrees from fifth synchronization instant Synchro 5, at 108 crankshaft degrees, fourth synchronization instant Synchro 4 of engine control unit 16 is marked. Third synchronization instant Synchro 3 is marked at 288 crankshaft degrees, second synchronization instant Synchro 2 at 468 crankshaft degrees and first synchronization instant Synchro 1 at 648 crankshaft degrees, i.e., 72 crankshaft degrees before the ignition top dead center at 720 crankshaft degrees. As was shown on the basis of FIG. 4, the residual gas control strategy EGR-Strat and the setpoint value of the individual residual gas rfrgsetpoint are transmitted to engine control unit 16 at fifth synchronization instant Synchro 5. Then at fourth synchronization instant Synchro 4 at 108 crankshaft degrees new values are transmitted or updated, depending on whether new values are available for the setpoint value in internal residual gas rfrgsetpoint or residual gas control strategy EGR-Strat. In addition, at fourth synchronization instant Synchro 4, factor fdrossev, setpoint fresh gas charge rlsetpoint, and charge type Fü-Art are transmitted to valve control unit 20.

Subsequently at third synchronization instant Synchro 3 of the engine control unit at 288 crankshaft degrees, depending on whether new values are available for factor fdrossev, for setpoint fresh gas charge rlsetpoint or charge type Fü-Art, the new values are transmitted to valve control unit 20. This transmission at third synchronization instant Synchro 3 is particularly necessary at low speeds of internal combustion engine 1. At second synchronization instant Synchro 2 at 468 crankshaft degrees no transmission takes place between engine control unit 16 and valve control unit 20. At first synchronization instant Synchro 1 of engine control unit 16 at 648 crankshaft degrees, first transmission device 55 of engine control unit 16 transmits setpoint high pressure efficiency etaAVsetpoint to valve control unit 20.

With the exemplary embodiment of the control system described above, and the method described on the basis of the control system, the control of charging of the cylinders of internal combustion engine 1 is synchronized and the fastest possible implementation of changes in torque is achieved together with optimum efficiency and preservation of a specified richness of the combustion. In addition, the computing load in engine control unit 16 and valve control unit 20 is limited to a minimum. It is also possible with the control system described above and the corresponding method to limit the data transmission rate between engine control unit 16 and valve control unit 20 to a minimum. The rapid implementation of changes in torque is achieved through very fast charging dynamics. The fast charging dynamics also make it possible to lower an idling speed and to reduce the use of ignition angle variation in idling speed regulation while maintaining very good idling quality. In addition, the control system described above and the corresponding method enable very fast reduction of torque contributions of the individual cylinders of internal combustion engine 1 to the torque of internal combustion engine 1 through early opening of exhaust valve 8 of internal combustion engine 1.

Although the above embodiment is directed to a four-cylinder internal combustion engine, it is obvious to those skilled in the art that the present invention is also applicable to internal combustion engines having more than four cylinders. In that case the instants of time indicated above are shifted accordingly. For example, in an internal combustion engine having n cylinders the corresponding values must be sent not 7 synchros ahead, but (2*n)−1 synchros.

What is claimed is:

1. A control system for an internal combustion engine, including a cylinder including an intake valve and an exhaust valve which include a fully variable valve-gear assembly, comprising:
   an engine control unit configured to determining setpoint values relating to a fresh gas charge, an internal residual gas charge, a torque reduction system, a residual gas control strategy and a charging type, of the cylinder of the internal combustion engine; and
   a transmission device configured to perform crankshaft-angle-synchronous transmission of the setpoint values determined by the engine control unit relating to the fresh gas charge, the charging strategy, the internal residual gas charge, the residual gas control strategy, and the torque reduction to a valve control unit;
   wherein the valve control unit is configured to trigger the fully variable valve-gear assembly of the intake and exhaust valves of the cylinder of the internal combustion engine on the basis of the setpoint values relating to the fresh gas charge, the internal residual gas charge, the torque reduction, the residual gas control strategy, and the charging type.

2. The control system according to claim 1, wherein the engine control unit is configured to determine a first crankshaft-angle-synchronous synchronization pattern in accordance with an output signal of a crankshaft angle sensor, the transmission device configured to transmit the setpoint values relating to the fresh gas charge, the internal residual gas charge, the torque reduction, the residual gas control strategy, and the charging type to the valve control unit in synchronization with the first crankshaft-angle-synchronous synchronization pattern of the engine control unit, the valve control unit configured to determine a second crankshaft-angle-synchronous synchronization pattern on the basis of the output signal of the crankshaft angle sensor, the second synchronization pattern configured to trail the first synchronization pattern by a first predefined angle.

3. The control system according to claim 1, wherein the first crankshaft-angle-synchronous synchronization pattern includes at least one first synchronization instant, a second synchronization instant, a third synchronization instant, a fourth synchronization instant, a nd a fifth synchronization instant;
   wherein the first synchronization instant is a second predefined angle before an ignition top dead center of the cylinder of the internal combustion engine, the second synchronization instant is a third predefined angle before the first synchronization instant, the third synchronization instant is a third predefined angle before the second synchronization instant, the fourth synchronization instant is the third predefined angle before the third synchronization instant, and the fifth synchronization instant is the third predefined angle before the fourth synchronization instant; and
   wherein the transmission device is configured to transmit the setpoint values relating to the internal residual gas charge, and the residual gas control strategy to the valve control unit at the fifth synchronization instant, the setpoint values relating to the fresh gas charge and the charging type at the fourth synchronization instant, and the setpoint value relating to the torque reduction at the first synchronization instant.

4. The control system according to claim 3, wherein the transmission device is configured to transmit updated setpoint values relating to the internal residual gas charge and the residual gas control strategy at the fourth synchronization instant, the transmission device configured to transmit updated setpoint values relating to the fresh gas charge and the charging type to the valve control unit at the third synchronization instant.

5. The control system according to claim 1, further comprising a fuel determination device arranged in the engine control unit configured to determine a minimum quantity of fuel aspirated from an intake manifold of the internal combustion engine in a subsequent aspiration and a maximum quantity of fuel aspirated from the intake manifold of the internal combustion engine in the subsequent aspiration.

6. The control system according to claim 5, wherein the fuel determination device includes an injection quantity determination device configured to determine a quantity of fuel injected into the intake manifold of the cylinder since a prior closing of the intake valve in accordance with a control signal of a fuel injector of the cylinder of the internal combustion engine and a quantity of fuel still to be injected before the closing of the fuel injector.

7. The control system according to claim 5, wherein the fuel determination device includes a wall film determination device configured to determine a wall film remaining in the intake manifold of the cylinder after a prior closing of the intake valve and a wall film to be expected subsequent to an impending closing of the intake valve of the cylinder.

8. The control according to claim 2, wherein the first angle in an internal combustion engine including n cylinders is $720°/2*n$.

9. The control system as recited in claim 3, wherein the third angle in an internal combustion engine including n cylinders is $720°/n$.

10. A method of controlling an operation of an internal combustion engine including a cylinder including an intake valve and an exhaust valve which include a fully variable valve-gear assembly, comprising:

determining setpoint values relating to a fresh gas charge, an internal residual gas charge, a torque reduction, a residual gas control strategy, and a charging type of the cylinder of the internal combustion engine;

crankshaft-angle-synchronous transmission of the determined setpoint values relating to the fresh gas charge, the charging strategy, the internal residual gas charge, the residual gas control strategy, and the torque reduction from an engine control unit to a valve control unit; and triggering the fully variable valve-gear assembly of the intake and exhaust valves of the cylinder of the internal combustion engine on the basis of the setpoint values relating to the fresh gas charge, the internal residual gas charge, the torque reduction, the residual gas control strategy and the charging strategy.

11. The method according to claim 2, further comprising:

determining a first crankshaft-angle-synchronous synchronization pattern in accordance with an output signal of a crankshaft angle sensor and operation of the engine control unit in synchronization with the first synchronization pattern;

transmitting the setpoint values relating to the fresh gas charge, the internal residual gas charge, the torque reduction, the residual gas control strategy, and the charging strategy in synchronization with the first crankshaft-angle-synchronous synchronization pattern of the engine control unit, from the engine control unit to the valve control unit; and determining a second crankshaft-angle-synchronous synchronization pattern, the second synchronization pattern configured to trail the first synchronization pattern by a first predefined angle, and operation of the valve control unit in synchronization with the second synchronization pattern.

12. The method according to claim 2, wherein the first crankshaft-angle-synchronous synchronization pattern includes at least a first synchronization instant, a second synchronization instant, a third synchronization instant, a fourth synchronization instant, and a fifth synchronization instant;

wherein the first synchronization instant is a second predefined angle before an ignition top dead center of a cylinder of the internal combustion engine, the second synchronization instant is a third predefined angle before the first synchronization instant, the third synchronization instant is the third predefined angle before the second synchronization instant, the fourth synchronization instant is the third predefined angle before the third synchronization instant and the fifth synchronization instant is the third predefined angle before the fourth synchronization instant; and wherein the transmission device is configured to transmit the setpoint values relating to the internal residual gas charge and the residual gas control strategy to the valve control unit at the fifth synchronization instant, and the setpoint values relating to the fresh gas charge and the charging strategy at the fourth synchronization instant, and the setpoint value relating to the torque reduction at the first synchronization instant.

13. The method according to claim 12, further comprising:

transmitting updated setpoint values relating to the internal residual gas charge and the residual gas control strategy to the valve control unit at the fourth synchronization instant; and transmitting updated setpoint values relating to the fresh gas charge and the charging strategy to the valve control unit at the third synchronization instant.

14. The method according to claim 2, further comprising determining a minimum quantity of fuel aspirated from an intake manifold of the internal combustion engine in a subsequent aspiration and a maximum quantity of fuel aspirated from the intake manifold of the internal combustion engine in the subsequent aspiration.

15. The method according to claim 14, further comprising determining a quantity of fuel injected into the intake manifold of the cylinder since a prior closing of the intake valve and of a quantity of fuel still to be injected up until the closing of the fuel injector in accordance with a control signal of a fuel injector of the cylinder of the internal combustion engine.

16. The method according to claim 14, further comprising determining a wall film remaining in the intake manifold of the cylinder after a prior closing of the intake valve and a wall film to be expected subsequent to an impending closing of the intake valve of the cylinder.

17. The method according to claim 11, wherein the first angle in an internal combustion engine including n cylinders is $720°/2*n$.

18. The method as recited in claim 12, wherein the third angle in an internal combustion engine including n cylinders is $720°/n$.

* * * * *

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 1, line 4, insert heading --Field of the Invention--

Column 1, line 14, insert heading --Background Information--

Column 1, line 16, change "valve lifting curve is" to --valve lifting curve may be--

Column 1, line 19, change "engine does not permit" to --engine may not permit--

Column 1, line 25, change " is only possible" to --may only be possible--

Column 1, line 26, change " cannot be optimized" to --may not be optimized--

Column 1, line 30, change "and-depending" to --and, depending--

Column 1, line 31, change "combustion engine-" to --combustion engine,--

Column 1, line 37, change "processes are flexible." to --processes may be flexible.--

Column 1, line 39, change "are controlled by" to --may be controlled by--

Column 1, line 40, change "and/or closing speed" to --and/or closing speed,--

Column 1, line 41, change "known fully" to --Conventional fully--

Column 1, line 42, change "are for example" to --are, for example,--

Column 1, line 43, change "valve control SOLV and" to --valve control and--

Column 1, line 44, change "Also known are mechanical" to --Conventional mechanical--

Column 1, line 45, change "mechanisms such as" to --mechanisms include--

Column 1, line 46, change "control VVT in combination" to --control in combination--

Column 1, line 48, change "engine does" to --engine may--

Column 1, line 52, change "closing speed, are" to --closing speed, may be--

Column 1, line 53, change "limited only by" to --limited by--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 1, line 55, change "a current cylinder" to --a current cylinder,--

Column 1, line 62, change "usually has an engine" to --conventionally has an engine--

Column 1, line 63, change "which are connected" to --which may be connected--

Column 1, line 65, change "signals are determined" to --signals may be determined--

Column 1, line 67, change "based for example on" to --based, for example, on --

Column 2, line 3, change "unit are conveyed" to --unit may be conveyed--

Column 2, line 6, change "valves, an opening lift" to --valves, opening lift--

Column 2, line 7, change "valves, and an opening" to --valves, and opening--

Column 2, line 11, change "it is necessary" to --it may be necessary--

Column 2, line 17, change "torque misetpoint" to --torque, misetpoint, and a --

Column 2, line 18, change "speed nmot of the" to --speed, nmot, of the--

Column 2, line 19, change "lambda efficiency" to --lambda, efficiency--

Column 2, line 21, change "etalamsetpoint and a desired spark angle efficiency" to --etalamsetpoint, and a desired spark angle efficiency,--

Column 2, line 22, change "charge rldesire of the " to --charge, rldesire, of the--

Column 2, line 24, change "charge rldesire is calibrated" to --charge, rldesire, is calibrated--

Column 2, line 29, change "valve nmot specifies" to --valve, nmot, specifies--

Column 2, line 35, insert heading --Summary--

Column 2, line 35, change "The object of the present invention is to provide" to --It is an object of the present invention to provide--

Column 2, lines 41-45, delete "This object...from the subclaims."

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 2, line 45, insert heading --Brief Description of the Drawings--

Column 2, line 49, change "FIG. 1 shows" to --FIG. 1 illustrates--

Column 2, line 52, change "valve-gear assembly;" to --valve-gear assembly.--

Column 2, line 53, change "FIG. 2 shows a valve actuator;" to --FIG. 2. illustrates a valve actuator.--

Column 2, line 54, change "FIG. 3 shows" to --FIG. 3 illustrates--

Column 2, line 57, change "shaft angle;" To --shaft angle according to the present invention.--

Column 2, lines 58-59, change " FIG. 4 shows an exemplary embodiment of the engine control unit of FIG 1;" to --FIG. 4 illustrates an example embodiment of the engine control unit of FIG. 1.--

Column 2, line 60, change "a diagram to explain" to --a diagram explaining an example--

Column 2, line 62, change "FIG. 1; and" to --of FIG. 1.--

Column 2, line 63, change "shows a known" to --illustrates a conventional--

Column 2, line 66, insert --Detailed Description--

Column 3, line 3, change "this embodiment." to --this example embodiment.--

Column 3, line 5, change "specifications are" to --specifications may be--

Column 3, line 12, change "is connected to" to --may be connected to--

Column 3, line 21, change "Intake valve 7 is" to --Intake valve 7 may be--

Column 3, line 27, change "a stream of air flows" to --a stream of air may flow--

Column 3, line 31, change "are opened and closed" to --may be opened and closed--

Column 3, line 35, change "which is designed" to --which may be designed--

UNITED STATES PATENT AND TRADEMARK OFFICE
CERTIFICATE OF CORRECTION

| | | |
|---|---|---|
| PATENT NO. | : 6,802,299 B2 | |
| APPLICATION NO. | : 10/257350 | |
| DATED | : October 12, 2004 | |
| INVENTOR(S) | : Mischker et al. | |

It is certified that error appears in the above-identified patent and that said Letters Patent is hereby corrected as shown below:

Column 3, line 36, change "which is connected" to --which may be connected--

Column 3, line 38, change "is applied to" to --may be applied to--

Column 3, line 44, change "sensor 15 is" to --sensor 15 may be--

Column 3, line 47, change "valve 18 is located" to --valve 18 may be located--

Column 3, line 52, change "which is located" to --which may be located--

Column 3, line 55, change "is then aspirated" to --may then be aspirated--

Column 3, line 58, change "piston 2 is expelled" to --piston 2 may be expelled--

Column 3, line 59, change "which is opened" to --which may be opened--

Column 3, line 60, change "is then carried away" to --may then be carried away--

Column 3, line 61, change "an exhaust system (not shown)." to --an exhaust system.--

Column 3, line 63, change "fuel is aspirated" to --fuel may be aspirated--

Column 4, line 3, change "charge reduction collects" to --charge reduction may collect--

Column 4, line 4, change "forms a film" to --form a film--

Column 4, line 10, change "is connected to" to --may be connected to--

Column 4, line 11, change "unit 16 is also" to --unit 16 may also be--

Column 4, line 12, change "controls the actuation" to --control the actuation--

Column 4, line 15, change "unit 16 determines" to --unit 16 may determine--

Column 4, line 17, change "are transmitted to" to --may be transmitted to--

Column 4, line 21, change "unit 20 has" to --unit 20 may have--

Column 4, line 23, change "which are transmitted" to --which may be transmitted--

UNITED STATES PATENT AND TRADEMARK OFFICE
CERTIFICATE OF CORRECTION

PATENT NO.        : 6,802,299 B2
APPLICATION NO.   : 10/257350
DATED             : October 12, 2004
INVENTOR(S)       : Mischker et al.

It is certified that error appears in the above-identified patent and that said Letters Patent is hereby corrected as shown below:

Column 4, line 24, change "unit 20 emits" to --unit 20 may emit--

Column 4, line 44, delete "in the same way"

Column 4, line 45, delete "such as"

Column 4, lines 48-49, change "controllers such as Vanos" to --controllers, such as Vanos--

Column 4, line 51, change "valve 21 is positioned" to --valve 21 may be positioned--

Column 4, line 54, change "valve 7 is positioned" to --valve 7 may be positioned--

Column 4, line 56, change "is mounted" to --may be mounted--

Column 4, line 57, change "Valve foot 25 separates" to --Valve foot 25 may separate--

Column 4, line 58, change "connection 27 is provided" to --connection may be provided--

Column 4, line 61, change "chamber 23 is also connected" to --chamber 23 may also be connect--

Column 4, line 64, change "valve 28 are" to --valve 28 may be--

Column 4, line 66, change "unit 20 operates" to --unit 20 may operate--

Column 5, line 1, change "controls unit is preferably designed" to --control unit may be designed--

Column 5, line 4, change "in FIG. 2 is operated" to --in FIG. 2 may be operated--

Column 5, lines 11-12, delete "(not shown)"

Column 5, line 17, change "valve 7 closes" to --valve 7 may close--

Column 5, line 19, change "intake valve 7 is" to --intake valve 7 may be--

Column 5, line 23, "valve 21 is closed." to --valve 21 may be closed.--

UNITED STATES PATENT AND TRADEMARK OFFICE
CERTIFICATE OF CORRECTION

PATENT NO.       : 6,802,299 B2
APPLICATION NO.  : 10/257350
DATED            : October 12, 2004
INVENTOR(S)      : Mischker et al.

It is certified that error appears in the above-identified patent and that said Letters Patent is hereby corrected as shown below:

Column 5, line 24, change "valve 28 is" to --valve 28 may be--

Column 5, line 27, change "a collector (not shown). to --a collector.--

Column 5, line 32, change "chamber is closed." to --chamber may be closed.--

Column 5, line 33, change "valve 7 is controlled" to --valve 7 may be controlled--

Column 5, line 47, change "control signal zue of" to --control signal, zue, of--

Column 5, line 51, change "crankshaft angle a" to --crankshaft angle α--

Column 5, line 55, change "control signal ti of" to --control signal, ti, of--

Column 5, line 56, change "control signal zue of" to --control signal, zue, of--

Column 6, line 1, change "makes a subsequent reduction" to --may make a subsequent reduction--

Column 6, line 9, change "makes it possible" to --may make it possible--

Column 6, line 10, change "residual gas designates" to --residual gas may designate--

Column 6, line 25, change "Graphs 42 and 43 shown" to --Graphs 42 and 43 depict--

Column 6, line 48, change "signal zue of" to --signal, zue, of--

Column 6, line 50, change "signal zue of" to --signal, zue, of--

Column 6, line 52, change "signal zue of" to --signal, zue, of--

Column 6, line 60, change "control signal ti." to --control signal, ti.--

Column 6, line 60 change "control signal ti," to --control signal, it,--

Column 6, line 64, change "is preferable fixed" to --may be fixed--

Column 7, line 1, change "must be sufficient" to --may be sufficient--

Column 7, line 7, change "control signal ti," to --control signal, ti,--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 7, line 8, change "engine 1 is opened" to --engine 1 may be opened,--

Column 7, line 16, change "energy is not converted" to --energy may not be converted--

Column 7, line 20, change "exhaust valve is" to --exhaust valve may be--

Column 7, line 23, change "valve 8 is produced" to --valve 8 may be produced--

Column 7, line 34, change "must be set" to --may be set--

Column 7, lines 34-35, delete "This is especially true"

Column 7, line 35, change "at high rotational speeds, where the duration" to --At high rotational speeds, the duration--

Column 7, line 37, delete "It is also evident that if the"

Column 7, line 37, change "if the" to --If the--

Column 7, line 43, change "it can no longer be" to --it may no longer be--

Column 7, line 46, change "must also be" to --may also be--

Column 7, line 47, change "valve 8 is defined" to --valve 8 may be defined--

Column 7, line 48, change "The lift is defined" to --The lift may be defined--

Column 7, line 53, change "exhaust gas is implemented" to --exhaust gas may be implemented--

Column 7, line 57, delete "critical"

Column 7, line 64, delete "in particular"

Column 7, line 66, change "control signal zue." to --control signal, zue.--

Column 8, line 1, change "is defined by" to --may be defined by--

Column 8, line 3, change "Control signal ti" to --Control signal, ti,--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 8, line 3, change "is applied" to --may be applied directly--

Column 8, line 4, change "control signal zue" to --Control signal, zue,--

Column 8, line 5, change "is applied directly" to --may be applied directly--

Column 8, line 7, change "Now, with reference" to --With reference--

Column 8, lines 7-8 change "description will be given" to --description follows--

Column 8, line 15, change "charge rlwumd for a" to --charge, rlwumd, for a--

Column 8, line 16, change "setpoint torque" to --setpoint torque,--

Column 8, line 17, change "combustion $\lambda$ setpoint" to --combustion, $\lambda$ setpoint--

Column 8, line 18, change "angle efficiency etazwsetpoint." to --angle efficiency, etazwsetpoint.--

Column 8, line 19, change "charge rlwumd designates" to --charge, rlwumd, designates--

Column 8, line 20, change "charge is made up of" to --charge may be made up of--

Column 8, line 23, change "device such as" to --device, such as--

Column 8, line 25, change "combustion $\lambda$setpoint is a" to --combustion, $\lambda$setpoint, is a--

Column 8, line 28, change "angle efficiency" to --angle efficiency,--

Column 8, line 29, change "estazswsetpoint designates" to --estazswsetpoint, designates--

Column 8, line 32, change "angle efficiency is" to --angle efficiency may be--

Column 8, line 36, change "charge rlwumd in the" to --charge, rlwumd, in the--

Column 8, line 37, change "as was described" to --as described--

Column 8, line 39, change "desired charge rlwumd to a" to --desired charge, rhwumd, to a--

Column 8, line 45, change "exhaust valve (AV)." to --exhaust valve, AV.--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 8, line 46, change "efficiency etaAVset-" to -- efficiency, etaAVset- --

Column 8, line 47, change "point on the basis of torque misetpoint and the" to --point, on the basis of torque, misetpoint, and the--

Column 8, line 48, change "efficiency etzwetzwsetpoint." to --efficiency, etzwetzwsetpoint.--

Column 8, line 50, change "efficiency etaAVsetpoint" to --efficiency, etaAVsetpoint,--

Column 8, lines 50-51, delete "to a first…transmits the"

Column 8, line 51, change "high pressure efficiency" to --high pressure efficiency,"--

Column 8, line 52 change "etaAVsetpoint" to --etaAVsetpoint, to--

Column 8, line 53, change "instant Synchro 1." to --instant, Synchro 1.--

Column 8, line 62, change "combustion engine 1, is" to --combustion engine 1, may be--

Column 8, line 63, change "high pressure efficiency" to --high pressure efficiency,--

Column 8, line 64, change "etaAVsetpoint is" to --etaAVsetpoint, is--

Column 8, line 66, change "device 55 takes" to --device 55 may take--

Column 9, line 3, change "pattern is determined" to --pattern may be determined--

Column 9, line 6, change "instant Synchro 1," to --instant, Synchro 1,--

Column 9, line 7, change "instant Synchro 2, to --instant, Synchro 2,--

Column 9, line 8, change "instant Synchro 3," to --instant, Synchro 3,--

Column 9, line 8, change "synchronization instant" to --synchronization, instant,--

Column 9, line 9, change "instant Synchro 5," to --instant, Synchro 5,--

Column 9, line 10, change "instant Synchro 6," to --instant, Synchro 6,--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 9, line 11, change "instant Synchro 7." to --instant, Synchro 7.--

Column 9, lines 11-12, change "unit 16 determines" to --unit 16 may determine--

Column 9, line 13, change "instant Synchro 1 is" to --instant, Synchro 1, is--

Column 9, lines 15-16, change "angle is for example" to --angle may be, for example,--

Column 9, line 19, change "chro 7 exhibit" to --chro 7 may exhibit--

Column 9, line 22, change "embodiment is preferably" to --embodiment, may be--

Column 9, line 24, change "interval must be" to --interval may be--

Column 9, lines 25-26, change "angle is preferably" to --angle may be--

Column 9, line 27, change "unit 20 takes place" to --unit 20 may take place--

Column 9, line 30, delete "this means that"

Column 9, line 31, change "takes place in each case" to --may take place in each case--

Column 9, line 37, change "unit 20 determines" to --unit 20 may determine--

Column 9, line 39, change "efficiency etaAVsetpoint and triggers" to --efficiency, etaAVsetpoint, and may trigger--

Column 9, line 45, change "device 52 determines" to --device 52 may determine--

Column 9, line 51, change "signal is transmitted" to --signal may be transmitted--

Column 10, line 1, change "ensures that" to --may ensure that--

Column 10, line 4, change "determines control signals" to --may determine control signals--

Column 10, line 7, change "is perfectly 90°." to --may be 90°.--

Column 10, line 10, change "determines the second" to --may determine the second--

UNITED STATES PATENT AND TRADEMARK OFFICE
CERTIFICATE OF CORRECTION

PATENT NO.        : 6,802,299 B2
APPLICATION NO. : 10/257350
DATED             : October 12, 2004
INVENTOR(S)       : Mischker et al.

It is certified that error appears in the above-identified patent and that said Letters Patent is hereby corrected as shown below:

Column 10, line 12, change "device 52 emits a signal" to --device 52 may emit a signal--

Column 10, line 18, change "determines on the basis of desired charge rlwumd," to --may determine on the basis of desired charge, rlwumd,--

Column 10, line 21, change "charge rfrgsetpoint" to --charge, rfrgsetpoint,--

Column 10, line 24, change "device 53 determines" to --device 53 may determine--

Column 10, lines 24-25, change "control strategy EGR-Strat" to --control strategy, EGR-Strat,--

Column 10, line 28, change "gas charge rfrgsetpoint" to --gas charge, rfrgsetpoint,--

Column 10, line 29, change "control strategy EGR-Stat" to --control strategy, EGR-Strat,--

Column 10, line 31, change "device 58 transmits" to --device 58 may transmit--

Column 10, line 32, change "gas charge rfrgsetpoint" to --gas charge, rfrgsetpoint,--

Column 10, line 33, change "strategy EGR-Strat" to --strategy, EGR-Strat,--

Column 10, lines 33-34, change "This transmission takes place" to --This transmission may take place--

Column 10, line 34, change "instant Synchro 5" to --instant, Synchro 5,--

Column 10, line 38, change "instant Synchro 4" to --instant, Synchro 4,--

Column 10, line 39, change "instant Synchro 5" to --instant, Synchro 5,--

Column 10, line 40, change "charge rfrgsetpoint control strategy" to --charge, rfrgsetpoint, control strategy,--

Column 10, line 41, change "EGR-Strat" to --EGR-Strat,--

Column 10, line 42, change "instant Synchro 5," to --instant, Synchro 5,--

Column 10, line 43, change "device 58 transmits" to --device 58 may transmit--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 10 line 44, change "gas charge rfrgsetpoint" to --gas charge, rfrgsetpoint,--

Column 10, line 45, change "strategy EGR-Strat" to --strategy, EGR-Strat--

Column 10, line 46, change "instant Synchro 4" to --instant, Synchro 4,--

Column 10, line 49, change "residual gas charge" to --residual gas charge,--

Column 10, line 50, change "rfrgsetpoint or" to --rfrgsetpoint, or--

Column 10, line 50, change "strategy EGR-Strat" to --strategy, EGR-Strat,--

Column 10, line 51, change "This guarantees" to --This may guarantee--

Column 10, line 55, change "charge rfrgsetpoint" to --charge, rfrgsetpoint,--

Column 10, line 55, change "gas control strategy" to --gas control strategy,--

Column 10, line 56, change "EGR-Strat have been" to --EGR-Strat, have been--

Column 10, line 59, change "20 determines the instant" to --20 may determine the instant--

Column 10, line 61, change "residual gas rfrgsetpoint" to --residual gas, rfgrsetpoint,--

Column 10, line 62, change "strategy EGR-Strat and triggers" to --strategy, EGR-Strat, and may trigger--

Column 10, line 67, change "device 53 also determines" to --device 53 may also determine--

Column 11, line 1, change "charge rlwumd" to --charge, rlwumd,--

Column 11, line 1, change "setpoint value pspss etpoint" to --setpoint value, pspssetpoint,--

Column 11, line 3, change "setpoint value pssetpoint" to --setpoint value, pssetpoint,--

Column 11, line 6, change "setpoint value pssetpoint." to --setpoint value, pssetpoint. --

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 11, line 8, change "device 53 also determines" to --device 53 may also determine--

Column 11, line 9, change "charge rlwumd" to --charge, rlwumd,--

Column 11, line 9, change "gas setpoint value" to --gas setpoint value,--

Column 11, line 10, change "rfigrfigsetpoint for" to --rfigrfigsetpoint, for--

Column 11, line 15, change "pressure psp at" to --pressure, psp, at--

Column 11, line 16, change "pressure psp" to --pressure, psp,--

Column 11, line 17, change "is read from" to --may be read from--

Column 11, line 18, delete "preferably"

Column 11, line 20, change "pressure psp is output" to --pressure, psp, may be output--

Column 11, line 23, change "57 determines" to --57 may determine--

Column 11, line 23, change "air charge rlmax" to --air charge, rlmax,--

Column 11, lines 25-26, change "device 57 determines" to --device 57 may determine--

Column 11, line 26, change "fresh air charge rlmax" to --fresh air charge, rlmax,--

Column 11, line 28, change "gas setpoint valve rfigsetpoint" to --gas setpoint valve, rfigsetpoint,--

Column 11, line 31, change "pressure psp which is" to --pressure, psp, which is--

Column 11, line 33, change "device 57 determines" to --device 57 may determine--

Column 11, line 34, change "fresh air charge rlmax preferably" to --fresh air charge, rlmax,--

Column 11, line 34, delete "preferably"

Column 11, line 35, change "fresh air charge rlmax" to --fresh air charge, rlmax,--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 11, line 38, change "device 57 outputs" to --device 57 may output--

Column 11, line 41, change "device 51 determines" to --device 51 may determine--

Column 11, line 42, change "desired charge rlwumdm" to --desired charge rlwumdm,--

Column 11, line 43, change "fresh air charge rlmax" to --fresh air charge, rlmax--

Column 11, line 44, change "charge rlwumd." to --charge, rlwumd.--

Column 11, line 45 change "determined the implementable" to --may determine the implementable--

Column 11, line 45, change "desired charge" to --desired charges--

Column 11, line 46, change "two input valves" to --two input valves,--

Column 11, line 47, change "rlwumdm and rlmax" to --rlwumd and rlmax,--

Column 11, line 47, change "If then outputs" to --If then may output--

Column 11, line 48, change "desired charge, rlwumd" to --desired charge, rlwumd--

Column 11, line 51, change "device 61 determines" to --device 61 may determine--

Column 11, line 52, change "aspirated rkabwu" to --aspirated, rkabwu,--

Column 11, line 53, change "charge rlwumdm" to --charge, rlwumdm,--

Column 11, line 54, change "combustion λsetpoint." to --combustion, λsetpoint.--

Column 11, line 56, change "efficiency etalamsetpoint may" to --efficiency, etalamsetpoint, may--

Column 11, line 58, change "to be aspirated rkabwu" to --to be aspirated, rkabwu,--

Column 11, line 59, change "to be aspirated" to --to be aspirated,--

Column 11, line 60, change "rkabwu indicates" to --rkabwu, may indicate--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 11, line 63, change "number 63 designates" to --number 63 may designate--

Column 11, line 64, change "device 63, includes" to --device 63 may include--

Column 12, line 1, change "device 63 determines" to --device 63 may determine--

Column 12, line 2, change "fuel rkabmin aspirated" to --fuel, rkabmin, aspirated--

Column 12, line 4, change "fuel rkabmax aspirated" to --fuel, rkabmax, aspirated--

Column 12, line 7, change "aspirated rkabmin and" to --aspirated, rkabmin,--

Column 12, lines 7-8, change "quantity of fuel rkabmax" to --quantity of fuel, rkabmax,--

Column 12, line 9, change "aspiration define a" to --aspiration may define a --

Column 12, line 14, change "device 63 includes" to --device 63 may include--

Column 12, line 15, change "which is connected" to --which may be connected--

Column 12, line 19, change "device 65 is " to --device 65 may be--

Column 12, line 20, delete "likewise"

Column 12, line 21, change "device 64 determines" to --device 64 may determine--

Column 12, line 22, change "control signal ti" to --control signal, ti,--

Column 12, line 23, change "a quantity of fuel" to --a quantity of fuel,--

Column 12, line 24, change "rktineu injected" to --rktineu, injected--

Column 12, line 26, change "a quantity of fuel rktimaxm" to --a quantity of fuel, rktimaxm--

Column 12, line 27, change "the fuel quantity" to --the fuel quantity,--

Column 12, line 28, change "rktineu indicates" to --rktineu, may indicate--

UNITED STATES PATENT AND TRADEMARK OFFICE
CERTIFICATE OF CORRECTION

PATENT NO. : 6,802,299 B2  
APPLICATION NO. : 10/257350  
DATED : October 12, 2004  
INVENTOR(S) : Mischker et al.

It is certified that error appears in the above-identified patent and that said Letters Patent is hereby corrected as shown below:

Column 12, line 30, change "the fuel quantity" to --the fuel quantity,--

Column 12, line 31, change "rktimaxm indicates" to --rktimaxm, may indicate--

Column 12, line 34, change "device 64 outputs" to --device 64 may output--

Column 12, line 34, change "fuel quantity rktineu" to --fuel quantity, rktinieu--

Column 12, line 35, change "fuel quantity rktimaxm" to --fuel quantity, rktimaxm,--

Column 12, line 37, change "device 66 determines" to --device 66 may determine--

Column 12, line 38, change "charge type Fü-Art" to --charge type Fue-Art--

Column 12, line 39, change "actual value ps" to --actual value, ps,--

Column 12, line 41, change "which is determined by" to --which may be determined by--

Column 12, line 42, change "a factor fdrossev," to --a factor, fdrossev,--

Column 12, line 44, change "a wall film rkwtverb" to --a wall film, rkwtverb--

Column 12, line 46, change "a wall film rkwtverb" to --a wall film, rkwtverb--

Column 12, line 48, change "Fü-Art" to --Fue-Art--

Column 12, line 48, change "indicates whether" to --may indicate whether--

Column 12, line 51, change "of the cylinder is" to --of the cylinder may be--

Column 12, line 53, change "desired for example" to --desired, for example,--

Column 12, line 56, change "valve is closed" to --valve may be closed--

Column 12, line 61, change "desired is aspirated" to --desired may be aspirated--

Column 12, line 62, change "charge is expelled" to --charge may be expelled--

Column 12, line 65, change "valve 7 is closed" to --valve 7 may be closed--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 12, line 67, change "intake valve is then" to --intake valve may then--

Column 13, line 1, change "closed at 270" to --be closed at 270--

Column 13, line 5, change "strategy is specified" to --strategy may be specified--

Column 13, line 6, change "and is transmitted" to --and may be transmitted--

Column 13, line 7, change "Factor fdrossev," to --Factor, fdrossev,--

Column 13, lines 11-12, change "Factor fdrossev is determined" to --factor, frdrossev, may be determined--

Column 13, line 14, change "device 66 outputs" to --device 66 may output--

Column 13, lines 14-15, change "wall film rkwdverb" to --wall film, rkwdverb--

Column 13, line 19, change "device 66 also outputs wall film rkwderw" to --device 66 may also output wall film, rkwderw,--

Column 13, line 24, change "device 66 outputs wall film rkwderw" to --device 66 may also output wall film, rkwderw,--

Column 13, line 27, change "device 65 determines" to --device 65 may determine--

Column 13, line 28, change "fuel currently stored rkaktges" to --fuel currently stored, rkaktges,--

Column 13, line 30, change "also outputs" to --may also output--

Column 13, line 30, change "currently stored" to --currently stored,--

Column 13, line 31, change "rkaktges to a" to --rkahtges, to a --

Column 13, line 32, change "device 65 determines" to --device 65 may determine--

Column 13, line 33, change "the wall film" to --the wall film,--

Column 13, line 34, change "rkwdverbs remaining" to --rkwdverbs, remaining--

UNITED STATES PATENT AND TRADEMARK OFFICE
CERTIFICATE OF CORRECTION

| | |
|---|---|
| PATENT NO. | : 6,802,299 B2 |
| APPLICATION NO. | : 10/257350 |
| DATED | : October 12, 2004 |
| INVENTOR(S) | : Mischker et al. |

It is certified that error appears in the above-identified patent and that said Letters Patent is hereby corrected as shown below:

Column 13, line 36, change "quantity of fuel rktineu" to --quantity of fuel, rktineu--

Column 13, line 42, change "device 67 determines" to --device 67 may determine--

Column 13, line 43, change "may be aspirated rkabmax" to --may be aspirated, rkabmax--

Column 13, line 44, change "stored fuel rkatges" to --stored fuel, rkatges,--

Column 13, line 45, change "quantity of fuel rktimaxm" to --quantity of fuel, rktimaxm--

Column 13, line 46, change "injector 14 is closed," to --injector 12 is closed,--

Column 13, line 46, change "of wall film" to --of wall film,--

Column 13, line 47, change "rkwaderw to be expected" to --rkwaderw, to be expected--

Column 13, line 52, change "device 67 also determines" to --device 67 also determines--

Column 13, line 54, change "wall film rkwderw" to --wall film, rkwderw--

Column 13, line 56, change "fuel rkaktges:" to --fuel, rkaktges:--

Column 13, line 60, change "aspirated rkabwu," to --aspirated, rkabwu,--

Column 13, line 61, change "aspirated rkabmax," to --aspirated, rkabmax,--

Column 13, line 62, change "may be aspirated rkabmin" to --may be aspirated, rkabmin,--

Column 13, line 64, change "quantity of fuel rkabsetpoint" to --quantity of fuel, rkabsetpoint,--

Column 13, line 67, change "device 62 determines" to --device 62 may determine--

Column 14, line 2, change "fuel aspirated rkabwu," to --fuel aspirated, rkabwu,--

Column 14, line 3, change "may be aspirated rkabmin." to --may be aspirated, rkabmin.--

Column 14, line 4, change "quantities rkabwu and rkabmax." to --may be aspirated, rkabmax.--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 14, line 4, change "is then compared to" to --may then be compared to--

Column 14, line 5, change "may be aspirated rkabmax." to --may be aspirated, rkabmax.--

Column 14, line 6, change "is set equal to" to --may be set equal to--

Column 14, lines 7-8, change "fuel aspirated rkabsetpoint." to --fuel aspirated, rkabsetpoint.--

Column 14, line 8, change "device 62 performs" to --device 62 may output--

Column 14, line 12, change "device 62 outputs" to --device 62 may output--

Column 14, line 13, change "fuel aspirated rkabsetpoint" to --fuel aspirated, rkabsetpoint,--

Column 14, line 16, change "device 68 determines" to --device 68 may determine--

Column 14, line 17, change "fuel rksetpointfehl" to --fuel, rksetpointfehl,--

Column 14, line 19, change "device 68 determines" to --device 68 may determine--

Column 14, line 21, change "aspirated rkabsetpoint from" to --aspirated, rkabsetpoint, form--

Column 14, line 22, change "wall film rkwderw to be" to --wall film, rkwderw, to be--

Column 14, line 25, change "stored rkaktges determined" to --stored, rkaktges, determined--

Column 14, line 26, change "device 68 performs" to --device 68 may perform--

Column 14, line 31, change "device 68 outputs" to --device 68 may out put--

Column 14, line 32, change "fuel rksetpointfiehl still" to --fuel, rksetpointfehl, still--

Column 14, line 34, change "device 70 determines" to --device 70 may determine--

Column 14, line 35, change "control signal ti for" to --control signal, ti, for--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 14, line 37, change "control signal ti to" to --control signal, ti, to--

Column 14, line 39, change "device 69 determines" to --device 69 may determine--

Column 14, line 40, change "gas charge rlsetpoint of" to --gas charge, rlsetpoint, of--

Column 14, line 43, change "fuel aspirated rkabsetpoint." to --fuel aspirated, rkabsetpoint.--

Column 14, line 43, change "fresh gas charge" to --fresh gas charge,--

Column 14, line 44, change "rlsetpoint of the " to --rlsetpoint, of the--

Column 14, line 44, change "cylinder designates" to --cylinder may designate--

Column 14, line 45, change "Preferably, setpoint charge" to --Setpoint charge--

Column 14, line 46, change "device 69 reads" to --device 69 may read--

Column 14, lines 46-47, change "gas charge rksetpoint form" to --gas charge, rksetpoint, form--

Column 14, line 48, change "values λsetpoint and rkabsetpoint to --values, λsetpoint and rkabsetpoint.--

Column 14, line 49, change "device 69 outputs" to --device 69 may output--

Column 14, line 49, change "fresh gas charge" to --fresh gas charge,--

Column 14, line 50, change "rlsetpoint to" to --rlsetpoint, to--

Column 14, line 51, change "device 71 sets" to --device 71 may set--

Column 14, line 53, change "or sets a mixing strategy" to --or set a mixing strategy--

Column 14, line 56, change "device 71 determines factor fdrossev" to --device 71 may determine factor, fdrossev,--

Column 14, line 58, change "output signal Fü-Art" to --output signal, Fue-Art,--

UNITED STATES PATENT AND TRADEMARK OFFICE
CERTIFICATE OF CORRECTION

PATENT NO.         : 6,802,299 B2                                    Page 21 of 27
APPLICATION NO. : 10/257350
DATED                : October 12, 2004
INVENTOR(S)       : Mischker et al.

It is certified that error appears in the above-identified patent and that said Letters Patent is hereby corrected as shown below:

Column 14, line 59, change "outputs factor fdrossev," to --outputs factor, fdrossev,--

Column 14, line 60, change "type Fü-Art" to --type Fue-Art--

Column 14, line 60, change "gas charge rlsetpoint" to --gas charge, rlsetpoint--

Column 14, line 62, change "also outputs factor fdrossev" to --may also out put factor, fdrossev,--

Column 14, line 62, delete "F" at the end of line

Column 14, line 63, change "ü-Art" to --Fue-Art--

Column 14, line 64, change "is preferably predefined" to --may be predefined--

Column 14, line 66, change "device 72 transmits factor fdrossev," to --device 72 may transmit factor, fdrossev,--

Column 14, line 67, change "gas charge rlsetpoint" to --gas charge, rlsetpoint,--

Column 14, line 67, change "charge type Fü-Art" to --charge type Fue-Art--

Column 15, line 1, change "instant Synchro 5" to --instant, Synchro 5,--

Column 15, lines 3-4, change "instant Synchro 3," to --instant, Synchro 3,--

Column 15, line 4, change "device 72 compares" to --device 72 may compare--

Column 15, line 5, change "gas charge rlsetpoint" to --gas charge, rlsetpoint,--

Column 15, line 6, change " instant Synchro 4 with" to --instant, Synchro 4, with--

Column 15, line 7, change "gas charge rlsetpoint" to --gas charge, rlsetpoint--

Column 15, line 8, change "instant Synchro 3." to --instant, Synchro 3.--

Column 15, line 9, change "as charge rlsetpoint" to --gas charge, rlsetpoint,--

Column 15, lines 10-11, change "instant Synchro 3" to --instant, Synchro 3,--

UNITED STATES PATENT AND TRADEMARK OFFICE
CERTIFICATE OF CORRECTION

PATENT NO.          : 6,802,299 B2
APPLICATION NO. : 10/257350
DATED                  : October 12, 2004
INVENTOR(S)       : Mischker et al.

It is certified that error appears in the above-identified patent and that said Letters Patent is hereby corrected as shown below:

Column 15, line 11, change "gas charge rlsetpoint" to --gas charge, rlsetpoint,--

Column 15, line 13, change "instant Synchro 4," to --instant, Synchro 4,--

Column 15, line 14, change "gas charge rlsetpoint" to --gas charge, rlsetpoint--

Column 15, lines 15-16, change "instant Sychro 3" to --instant, Synchro 3,--

Column 15, line 16, change "fresh gas charges" to --fresh gas charges,--

Column 15, line 17, change "rlsetpoint at third" to --rlsetpoint, at third--

Column 15, lines 17-18, change "instants Sychro 3 and Synchro 4" to --instants, Synchro 3 and Synchro 4,--

Column 15, line 19, change "This guarantees" to --This way guarantee--

Column 15,, line 21, change "When factor fdrossev," to --When factor, fdrossev--

Column 15, line 21, change "fresh gas change rlsetpoint" to --fresh gas change, rlsetpoint,--

Column 15, line 22, change "charge type Fü-Art" to --charge type Fue-Art--

Column 15, line 23, change "instant Synchro 4" to --instant, Synchro 4,--

Column 15, line 24, change "unit 20 determines" to --unit 20 may determine--

Column 15, line 25, change "ends the triggering" to --end the triggering--

Column 15, line 27, change "factor fdrossev" to --factor, fdrossev,--

Column 15, line 28, change "gas charge rlsetpoint" to --gas charge, rlsetpoint--

Column 15, line 28, change "charge type Fü-Art" to --charge type, Fue-Art--

Column 15, line 30, change " instant Synchro 3" to --instant, Synchro 3,--

Column 15, line 31, change "and triggers second" to --and may trigger second--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 15, line 34, change "device 58" to --device 58,--

Column 15, line 36, change "first, second and" to --first, second, and--

Column 15, line 337, change "devices 55, 58 and 73" to --devices 55, 58, and 73--

Column 15, line 51, change "are carried out" to --may be carried out--

Column 15 line 66, change "device 71 are determined" to --device 71 may be determined--

Column 16, line 1, change "variables are designated" to --variables may be designated--

Column 16, line 8, change "variables are calculated" to --variables my be calculated--

Column 16, line 9, change "variables are calculated to --variables may be calculated--

Column 16, line 10, change "instant Synchro 7," to --instant, Synchro 7,--

Column 16, line 10, change "this is the earliest" to --this may be the earliest--

Column 16, line 12, change "variables are calculated" to --variables may be calculated--

Column 16, line 13, change "instant Synchro 6," to --instant, Synchro 6,--

Column 16, line 14, change "injection is updated" to --injection may be updated--

Column 16, line 15, change "output variables are" to --output variables may be--

Column 16, line 16, change "Instant Synchro 5," to --instant, Synchro 5,--

Column 16, line 18, change "residual gas rfrgsetpoint," to --residual gas, rfrgsetpoint,--

Column 16, line 19, change "gas is determined." to --gas may be determined.--

Column 16, line 20, change "variables are determined" to --variables may be determined--

Column 16, line 21, change "instant Synchro 4," to --instant Synchro 4,--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 16, line 22, change "instant Synchro 4," to --instant, Synchro 4--

Column 16, line 22, change "gas charge rlsetpoint" to --gas charge, rlsetpoint,--

Column 16, line 23, change "cylinder is determined" to --cylinder may be determined--

Column 16, line 25, change "variables are calculated" to --variables may be calculated--

Column 16, line 26, change "instant Syncbro 3," to --instant, Synchro 3,--

Column 16, line 27, change "gas charge rlsetpoint is determined." to --gas charge, rlsetpoint, may be determined.--

Column 16, line 29, change "output variables are" to --output variables may be--

Column 16, line 32, change "injection is determined" to --injection may be determined--

Column 16, line 34, change "variables is performed" to --variables may be performed--

Column 16, line 34, change "the values are" to --the values may be--

Column 16, line 36, change instant Synchro 7 to" to --instant, Synchro 7, to--

Column 16, line 36, change "instant Synchro" to --instant, Synchro,--

Column 16, line 37, change "instant Synchro 4 setpoint" to --instant, Synchro 4, setpoint--

Column 16, line 38, change "gas charge rlsetpoint is transmitted" to --gas charge, rlsetpoint, is transmitted--

Column 16, lines 39-40, change "Only after setpoint fresh gas charge rlsetpoint is transmitted, is" to --After setpoint fresh gas charge, rlsetpoint, is transmitted,--

Column 16, line 41, change "charge rlsetpoint then calculated" to --charge, rlsetpoint, may then be calculated--

Column 16, line 44, change "valves must be calculated" to --valves may be calculated--

Column 16, line 45, change "sequence begins preferentially" to --sequence may begin--

UNITED STATES PATENT AND TRADEMARK OFFICE
CERTIFICATE OF CORRECTION

PATENT NO.       : 6,802,299 B2
APPLICATION NO.  : 10/257350
DATED            : October 12, 2004
INVENTOR(S)      : Mischker et al.

It is certified that error appears in the above-identified patent and that said Letters Patent is hereby corrected as shown below:

Column 16, line 46, change "and ends at" to --and end at--

Column 16, line 47, change "synchros must be calculated" to --synchros may be calculated--

Column 16, lines 50-51, change "procedure should start" to --procedure may start--

Column 16, line 54, change "cylinder is sent." to --cylinder may be sent.--

Column 16, line 55, change "a diagram explaining" to --a diagram illustrating--

Column 16, line 57, change "device 58 and" to --device 58, and--

Column 16, line 60, change "crankshaft angle $\lambda$" to --crankshaft angle, $\lambda$, in--

Column 16, line 67, change "instant Synchro 5" to --instant, Synchro 5,--

Column 17, line 3, change "instant Synchro 5," to --instant, Synchro 5,--

Column 17, line 4, change "instant Synchro 4" to --instant, Synchro 4,--

Column 17, line 5, change "instant Synchro 3" to --instant, Synchro 3,--

Column 17, line 7, change "instant Synchro 2" to --instant, Synchro 2,--

Column 17, line 7, change "crankshaft degrees and" to-- crankshaft degrees, and--

Column 17, line 8, change "instant Synchro 1" to --instant, Synchro 1,--

Column 17, line 11, change "control strategy EGR-Strat" to --control strategy, EGR-Strat,--

Column 17, line 12, change "residual gas rfrgsetpoint are" to --residual gas, rfrgsetpoint, may be--

Column 17, line 17, change "internal residual gas" to --internal residual gas,--

Column 17, line 18, change "rfrgsetpoint or" to --rfrgsetpoint, or--

Column 17, line 18, change "control strategy EGR-Strat." to --control strategy, EGR-Strat.--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 17, line 19, change "instant Synchro 4, factor" to --instant, Synchro 4, factor,--

Column 17, line 20, change "as charge rlsetpoint" to --gas charge, rlsetpoint,--

Column 17, line 21, change "type Fü-Art are" to --type Fue-Art may be--

Column 17, line 22, change "instant Synchro 3" to --instant, Synchro 3,--

Column 17, line 24, change "factor fdrossev," to --factor, fdrossev,--

Column 17, lines 25-26, change "gas charge rlsetpoint or" to --gas charge, rlsetpoint, or--

Column 17 lines 25-26, change "charge type F ü-Art" to --charge type Fue-Art;--

Column 17, line 26, change "values are transmitted" to --values may be transmitted--

Column 17, lines 27-28, change "instant Synchro 3 is particularly necessary" to --instant, Synchro 3, may be necessary--

Column 17, lines 29-30, change "instant Synchro 2 at 468" to --instant, Synchro 2, at 468--

Column 17, line 32, change "instant Synchro 1 of" to --instant, Synchro 1, of--

Column 17, line 36, change "efficiency etaAVsetpoint" to --efficiency, etaAVsetpoint,--

Column 17, line 40, change "engine 1 is synchronized" to --engine 1 may be synchronized--

Column 17, line 41, change "changes in torque is" to --changes in torque may be--

Column 17, line 45, change "unit 20 is limited" to --unit 20 may be limited--

Column 17, line 45, change "It is also possible" to --It may also be possible--

Column 17, line 49, change "torque is achieved" to --torque may be achieved--

Column 17, line 55, change "method enable" to --method may enable--

Column 17, line 60, change "the above embodiment" to --the above example embodiment--

UNITED STATES PATENT AND TRADEMARK OFFICE
CERTIFICATE OF CORRECTION

PATENT NO. : 6,802,299 B2
APPLICATION NO. : 10/257350
DATED : October 12, 2004
INVENTOR(S) : Mischker et al.

It is certified that error appears in the above-identified patent and that said Letters Patent is hereby corrected as shown below:

Column 17, line 64, change "indicated above are" to --indicated above may be--

Column 17, line 66, change "valves must be" to --valves may be--

Signed and Sealed this

Seventeenth Day of October, 2006

JON W. DUDAS
*Director of the United States Patent and Trademark Office*